US011519783B2

(12) United States Patent
Taneda et al.

(10) Patent No.: US 11,519,783 B2
(45) Date of Patent: Dec. 6, 2022

(54) SPECTRAL PROPERTY ACQUISITION APPARATUS AND IMAGE FORMING APPARATUS

(71) Applicants: Yusuke Taneda, Kanagawa (JP); Kohei Shimbo, Kanagawa (JP); Yoichi Kubota, Tokyo (JP)

(72) Inventors: Yusuke Taneda, Kanagawa (JP); Kohei Shimbo, Kanagawa (JP); Yoichi Kubota, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/809,698

(22) Filed: Mar. 5, 2020

(65) Prior Publication Data
US 2020/0300701 A1      Sep. 24, 2020

(30) Foreign Application Priority Data

Mar. 20, 2019    (JP) .............................. JP2019-052508

(51) Int. Cl.
*G01J 3/28*      (2006.01)
*G01J 3/50*      (2006.01)
*G06T 7/90*      (2017.01)
*G06T 11/00*     (2006.01)

(52) U.S. Cl.
CPC .............. *G01J 3/2823* (2013.01); *G01J 3/50* (2013.01); *G06T 7/90* (2017.01); *G06T 11/001* (2013.01); *G06T 2207/10024* (2013.01)

(58) Field of Classification Search
None
See application file for complete search history.

(56) References Cited

U.S. PATENT DOCUMENTS

| 3,447,591 | A | * | 6/1969 | Foldessy ............ B22D 11/1282 |
| | | | | 164/442 |
| 4,266,251 | A | * | 5/1981 | Hara .................... H04N 1/1911 |
| | | | | 358/476 |
| 5,435,538 | A | | 7/1995 | Billings et al. |

(Continued)

FOREIGN PATENT DOCUMENTS

| JP | 2003-014546 | 1/2003 |
| JP | 2013-142644 | 7/2013 |
| JP | 2019-138883 | 8/2019 |

OTHER PUBLICATIONS

Extended European Search Report dated Aug. 4, 2020.

*Primary Examiner* — Rufus L Phillips
(74) *Attorney, Agent, or Firm* — Harness, Dickey & Pierce, P.L.C.

(57) ABSTRACT

A spectral property acquisition apparatus includes: a first conveying device to convey an object in predetermined conveying direction; a color data acquisition device including a plurality of spectroscopic sensors in the conveying direction, the plurality of spectroscopic sensors receive light emitted and reflected by the object to acquire color data on the object; a second conveying device to convey the color data acquisition device in a direction orthogonal to the conveying direction; and circuitry to estimate a spectral property of the object based on the color data. The circuitry controls the first conveying device so as to generate predetermined tension for the object in a color data acquisition area in which the color data on the object is acquired.

18 Claims, 16 Drawing Sheets

(56) References Cited

U.S. PATENT DOCUMENTS

| | | | | |
|---|---|---|---|---|
| 5,910,811 A | * | 6/1999 | Sato | B41J 13/10 347/104 |
| 2002/0001084 A1 | * | 1/2002 | Yokozawa | B41J 35/16 356/425 |
| 2002/0191188 A1 | * | 12/2002 | Hubble, III | G01J 3/504 356/402 |
| 2003/0007071 A1 | * | 1/2003 | Goto | A61B 5/448 348/61 |
| 2003/0050768 A1 | * | 3/2003 | Mestha | G01J 3/524 702/196 |
| 2004/0263921 A1 | * | 12/2004 | Iwago | H04N 1/00602 358/474 |
| 2011/0000947 A1 | * | 1/2011 | Cho | B65D 33/002 225/2 |
| 2011/0063615 A1 | | 3/2011 | Shimbo et al. | |
| 2011/0106472 A1 | | 5/2011 | Seo et al. | |
| 2011/0222056 A1 | | 9/2011 | Seo et al. | |
| 2011/0266742 A1 | * | 11/2011 | Sato | B65H 23/038 271/228 |
| 2011/0299104 A1 | | 12/2011 | Seo et al. | |
| 2011/0317149 A1 | | 12/2011 | Shimbo et al. | |
| 2012/0314232 A1 | * | 12/2012 | Barkai | H04N 1/00002 358/1.9 |
| 2013/0063723 A1 | | 3/2013 | Shimbo et al. | |
| 2013/0135426 A1 | * | 5/2013 | Wakayama | B41J 11/06 347/264 |
| 2013/0182251 A1 | | 7/2013 | Shimbo et al. | |
| 2013/0182256 A1 | | 7/2013 | Kubota et al. | |
| 2013/0235249 A1 | | 9/2013 | Shimbo et al. | |
| 2013/0235376 A1 | | 9/2013 | Kamijo et al. | |
| 2014/0333927 A1 | | 11/2014 | Shimbo et al. | |
| 2015/0049371 A1 | | 2/2015 | Kamijo et al. | |
| 2015/0253190 A1 | | 9/2015 | Seo et al. | |
| 2015/0319330 A1 | * | 11/2015 | Sullivan | H04N 1/00602 358/498 |
| 2015/0350493 A1 | * | 12/2015 | Sakatani | H04N 1/6091 358/504 |
| 2016/0261774 A1 | * | 9/2016 | Kuri | G01J 3/502 |
| 2016/0366296 A1 | | 12/2016 | Isokawa | |
| 2018/0101118 A1 | * | 4/2018 | Hiroe | G03G 15/5029 |
| 2019/0049305 A1 | * | 2/2019 | Qian | G01J 3/462 |
| 2019/0230254 A1 | | 7/2019 | Taneda et al. | |
| 2019/0250040 A1 | | 8/2019 | Taneda et al. | |
| 2020/0007694 A1 | | 1/2020 | Kubota et al. | |

\* cited by examiner

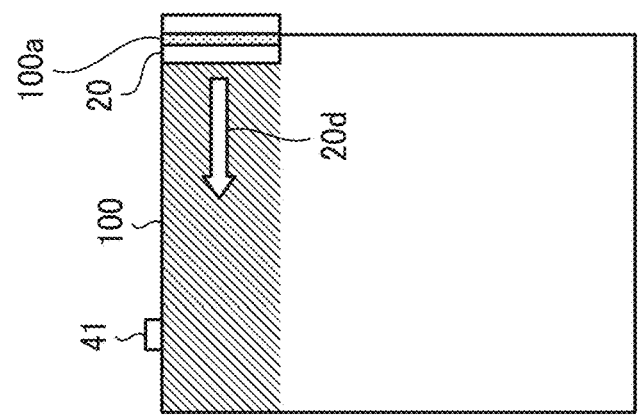
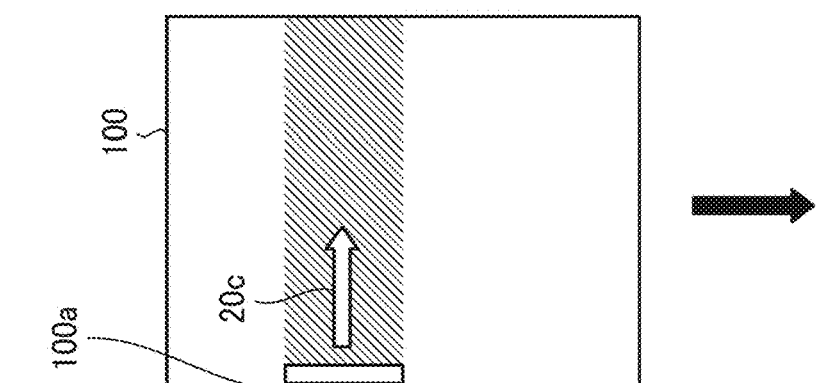
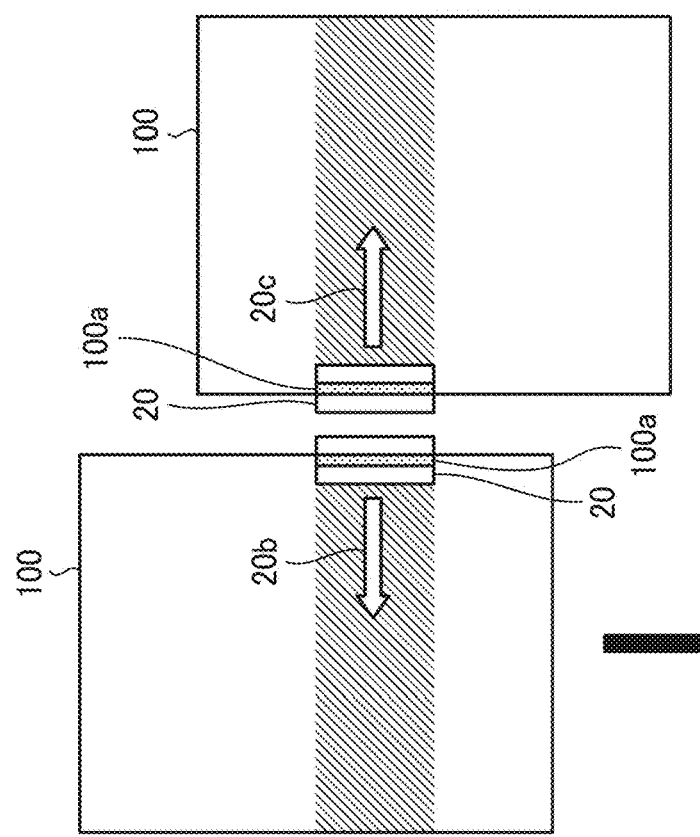
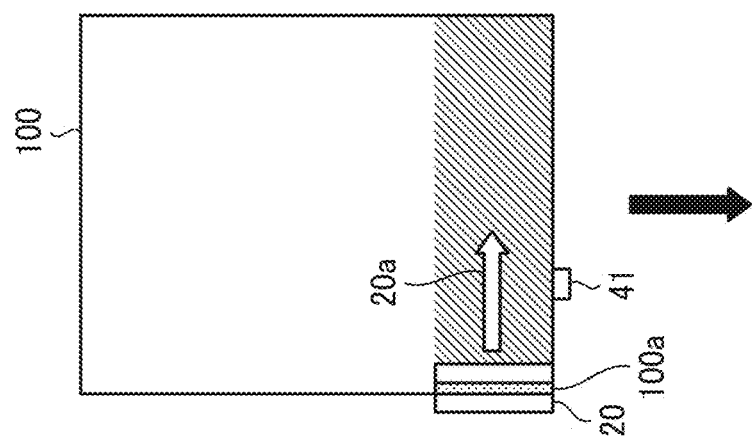

| COLOR CHART \ SPECTRO-SCOPIC SENSOR | $80_1$ | $80_2$ | $80_3$ | · | · | · |
|---|---|---|---|---|---|---|
| A | L*a*b*… | L*a*b*… | L*a*b*… | · | · | · |
| B | L*a*b*… | L*a*b*… | L*a*b*… | · | · | · |
| C | L*a*b*… | L*a*b*… | L*a*b*… | · | · | · |
| · | · | · | · | · | · | · |
| · | · | · | · | · | · | · |
| · | · | · | · | · | · | · |
| · | · | · | · | · | · | · |

SPECTRAL PROPERTY ACQUISITION APPARATUS AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2019-052508, filed on Mar. 20, 2019, in the Japan Patent Office, the entire disclosure of which is hereby incorporated by reference herein.

BACKGROUND

Technical Field

The present invention relates to a spectral property acquisition apparatus and an image forming apparatus.

Description of the Related Art

In recent years, with regard to full-color image forming apparatuses (e.g., printers or copiers) including an electrophotographic system or an inkjet system, there has been a demand for high image quality of color images on a recording medium such as a sheet, and an improvement in the color reproducibility has been one of the technical issues.

In order to improve the color reproducibility, there is a background art for acquiring the spectral property of the image on a recording medium based on an output signal obtained from a plurality of spectroscopic sensors arranged in a direction perpendicular to the conveying direction of the recording medium (See, for example, JP-5880053-B).

Furthermore, there is a background art for scanning color measurement in which a spectroscopic sensor executes two-dimensional scanning to perform the color measurement on the measurement target such as a color patch (see, for example, JP-2003-014546-A).

However, according to the background art disclosed in JP-5880053-B, the apparatus includes a linear light source having a high light intensity and capable of emitting light in a wide range to acquire the spectral property of an image in the entire width with high accuracy and therefore the apparatus may be expensive. Furthermore, according to the background art disclosed in JP-2003-014546-A, as the spectroscopic sensor executes two-dimensional scanning, it takes time to acquire the spectral property, and it is not practical to apply this background art to images generated by a multicolor printer in six or more colors for which the spectral properties of color patches in 5000 to 10000 colors are acquired.

SUMMARY

Example embodiments include a spectral property acquisition apparatus including: a first conveying device to convey an object in predetermined conveying direction; a color data acquisition device including a plurality of spectroscopic sensors in the conveying direction, the plurality of spectroscopic sensors receive light emitted and reflected by the object to acquire color data on the object; a second conveying device to convey the color data acquisition device in a direction orthogonal to the conveying direction; and circuitry to estimate a spectral property of the object based on the color data. The circuitry controls the first conveying device so as to generate predetermined tension for the object in a color data acquisition area in which the color data on the object is acquired.

The spectral property acquisition apparatus may be incorporated in an image forming apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 9A to 9D are plan views illustrating the sheet when seen in a +Z-axis direction during color data acquisition by the spectral property acquisition apparatus according to the first embodiment;

Figure 1:
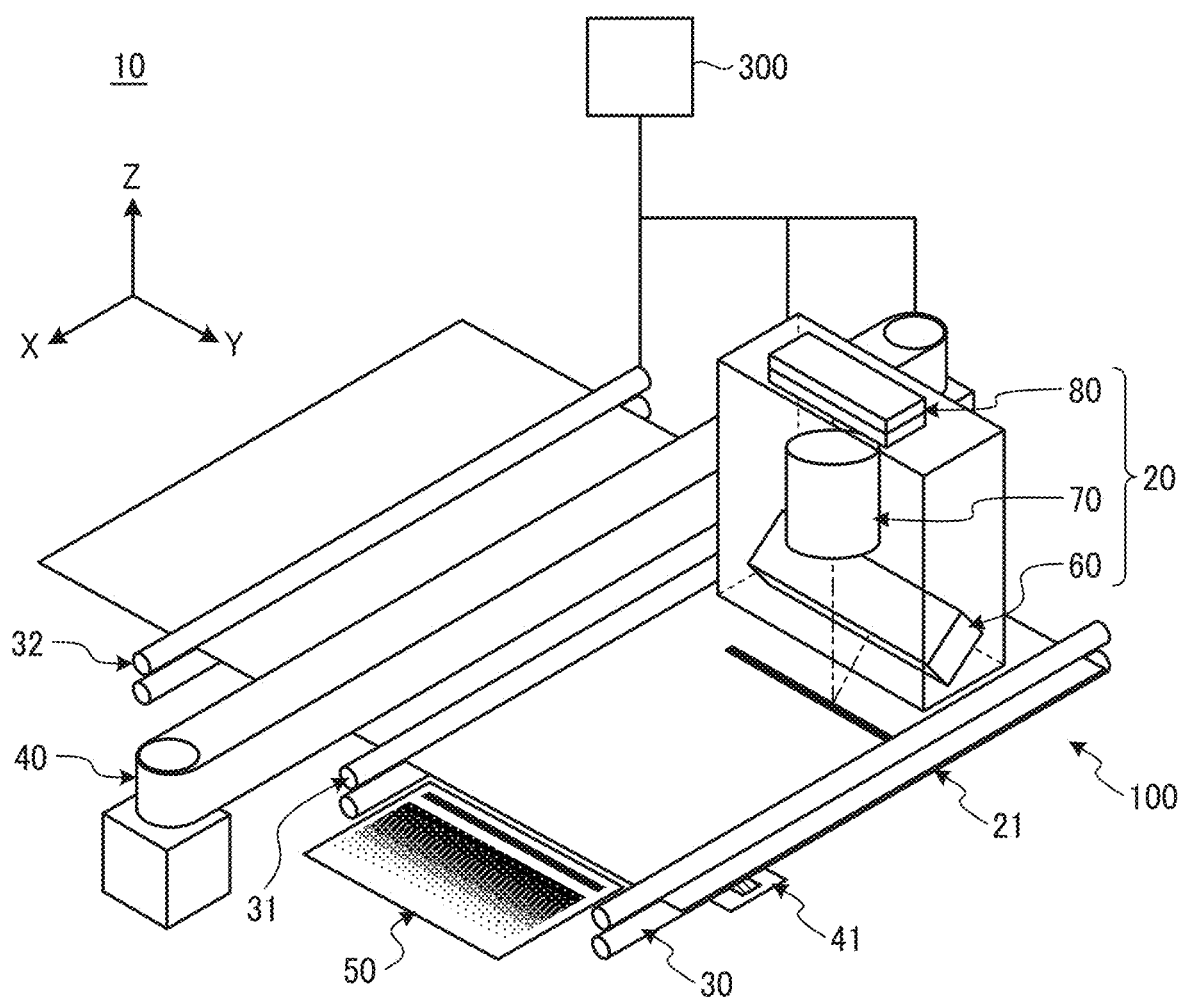
FIG. 1 is a perspective view illustrating an example of the configuration of a spectral property acquisition apparatus according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the accompanying drawings, embodiments of a spectral property acquisition apparatus are described in detail below. The spectral property acquisition apparatus may be incorporated in, for example, the image forming apparatus such as a copier, printer, and multifunctional peripheral.

In an example described according to embodiments, the object whose spectral property is acquired includes an image carrier medium such as a sheet, and the object whose spectral property is acquired is simply referred to as a sheet. In some figures, a solid arrow indicates a direction. Among the directions indicated by arrows, the X-axis direction indicates the width direction of a sheet, the Y-axis direction indicates the conveying direction of a sheet, and the Z-axis direction indicates a direction perpendicular to the XY plane. The X-axis direction is an example of a "direction crossing a predetermined conveying direction", and the Y-axis direction is an example of a "predetermined conveying direction".

In embodiments, the terms "image formation", "recording", "printing", "forming", etc. are all synonymous.

First Embodiment

Referring to the drawings, a first embodiment of the present invention is first described. FIG. 1 is a perspective view illustrating an example of the configuration of a spectral property acquisition apparatus 10 according to the first embodiment.

As illustrated in FIG. 1, the spectral property acquisition apparatus 10 includes a color data acquisition device 20, sheet conveying devices 30, 31, and 32, a sheet detection sensor 41, a color data acquisition device conveying device 40, a calibration color chart 50, and a controller 300. The color data acquisition device 20 includes a line illumination light source 60, a reduction imaging lens 70, and a spectroscopic device 80. The color data acquisition device 20 is an example of a "color data acquisition device". The sheet conveying devices 30, 31, and 32 are examples of a "first conveying device". The color data acquisition device conveying device 40 is an example of a "second conveying device".

The sheet conveying devices 30, 31, and 32 convey a sheet 100 in the Y-axis direction at a constant speed. Each of the sheet conveying devices 30, 31, and 32 includes, for example, a pair of nip rollers. As illustrated in FIG. 1, the sheet conveying devices 30, 31, and 32 nip the sheet 100 by using the nip rollers and convey the sheet 100 in accordance with the rotation of the nip rollers.

The sheet conveying devices 30, 31, and 32 are described below in detail.

Figure 2:
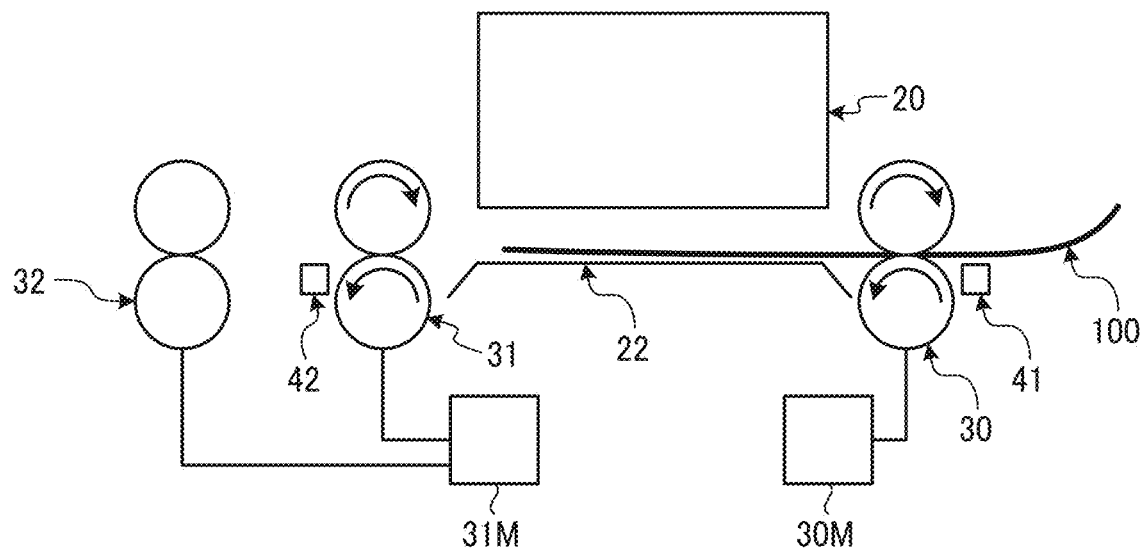
FIG. 2 is a diagram illustrating an example of the configuration in the periphery of sheet conveying devices according to the first embodiment.

FIG. 2 is a diagram illustrating an example of the configuration in the periphery of the sheet conveying devices 30, 31, and 32. As illustrated in FIG. 2, the sheet conveying devices 30, 31, and 32 convey the sheet 100 in the Y-axis direction at a constant speed. Each of the sheet conveying devices 30, 31, and 32 includes, for example, a pair of nip rollers. As illustrated in FIG. 2, the sheet conveying devices 30, 31, and 32 nip the sheet 100 by using the nip rollers and convey the sheet 100 in accordance with the rotation of the nip rollers.

The sheet conveying devices 30 and 31 are coupled to driving motors 30M and 31M, respectively. The sheet conveying device 32 is coupled to the driving motor 31M that is shared by the sheet conveying device 31.

The driving motor 30M that drives the nip rollers (the sheet conveying device 30) located upstream of the conveying direction in the color data acquisition area 21 has a higher drive power than that of the driving motor 31M that drives the nip rollers (the sheet conveying device 31) located downstream of the conveying direction in the color data acquisition area 21. This allows the nip rollers (the sheet conveying device 30) located upstream of the conveying direction in the color data acquisition area 21 to firmly nip the sheet 100.

The nip rollers (the sheet conveying device 30) located upstream of the conveying direction in the color data acquisition area 21 are rotatable forward and also backward.

The spectral property acquisition apparatus 10 includes the sheet detection sensor 41 and a sheet detection sensor 42. The sheet detection sensor 41 detects the leading edge of the sheet 100 conveyed to the sheet conveying device 30 just before the color data acquisition area 21 (on the upstream of the conveying direction). The sheet detection sensor 42 detects the leading edge of the sheet 100 conveyed to the sheet conveying device 31 on the downstream of the conveying direction in the color data acquisition area 21.

For example, each of the sheet detection sensors 41 and 42 irradiates the sheet 100 with light to detect the reflected light with a photodiode, or the like. Based on the output of the sheet detection sensors 41 and 42, it is detected that the sheet 100 is located at the color data acquisition area 21 of the color data acquisition device 20.

As illustrated in FIG. 2, a measurement reference surface 22 is provided under the color data acquisition area 21. The measurement reference surface 22 covers the moving area in the X-axis direction over the color data acquisition area 21 by the color data acquisition device conveying device 40. The measurement reference surface 22 is provided such that the measurement reference surface 22 is in close contact with the sheet 100.

The measurement reference surface 22 includes, for example, a wide guide plate including a white- or black-coated sheet metal. The color condition is different depending on the purpose, for example, the color of coating is black in the case of the use compatible with ISO or for the calibration of a printing apparatus and is white in the case of generating a color profile for printing. The black and the white are replaceable.

Referring back to FIG. 1, the color data acquisition device conveying device 40 conveys the color data acquisition device 20 in the width direction of the sheet 100. The color data acquisition device conveying device 40 includes a conveying stage including, for example, a ball screw and a guide.

The calibration color chart 50 is used for the calibration of a conversion matrix that is used to calculate a spectral property. The calibration color chart 50 is separately described in detail.

The spectral property acquisition apparatus 10 may simultaneously acquire spectral properties at multiple positions in the Y-axis direction within the color data acquisition area 21 of the sheet 100.

The line illumination light source 60 irradiates the color data acquisition area 21 with linear light in a direction at an approximately 45-degree tilt with respect to the normal direction of the sheet 100. The line illumination light source 60 illuminates an appropriate area with respect to the color data acquisition area 21 so as to prevent the light reflected by an area of the sheet 100 other than the color data acquisition area 21 from entering the spectroscopic device 80.

As the line illumination light source 60, for example, a white light emitting diode (LED) array having an intensity in substantially the entire visible light range may be used. The line illumination light source 60 is not limited to thereto, and a fluorescent lamp such as a cold cathode tube, a lamp light source, or the like, may be used as the line illumination light source 60.

The line illumination light source 60 may emit light in a wavelength range for spectroscopy and may uniformly illuminate the entire color data acquisition area 21. A collimator lens may be provided to collect the light emitted from the line illumination light source 60 and emit parallel light or convergent light to the sheet 100.

The reduction imaging lens 70 is provided such that the optical axis of the reduction imaging lens 70 coincides with the normal direction of the sheet 100. The reduction imaging lens 70 has the function to cause the light reflected from the sheet 100, i.e., the reflected light beam, to be focused on the incident surface of the spectroscopic device 80 at a predetermined magnification. The reduction imaging lens 70 provided with image-space telecentricity allows the chief rays of light beam incident on the image plane to be substantially parallel to the optical axis. The reduction imaging lens 70 may include a plurality of lenses.

Although the reduction imaging lens 70 provided with image-space telecentricity allows the chief rays of light beam incident on the image plane to be substantially parallel to the optical axis in an easy manner, the reduction imaging lens 70 may be provided with no image-space telecentricity. In this case, the same advantage may be produced by the adjustment on, for example, the positional relationship between each pinhole in a pinhole array and each lens in a lens array described later in accordance with the tilt of the chief ray at each position on the image plane.

Figure 3:
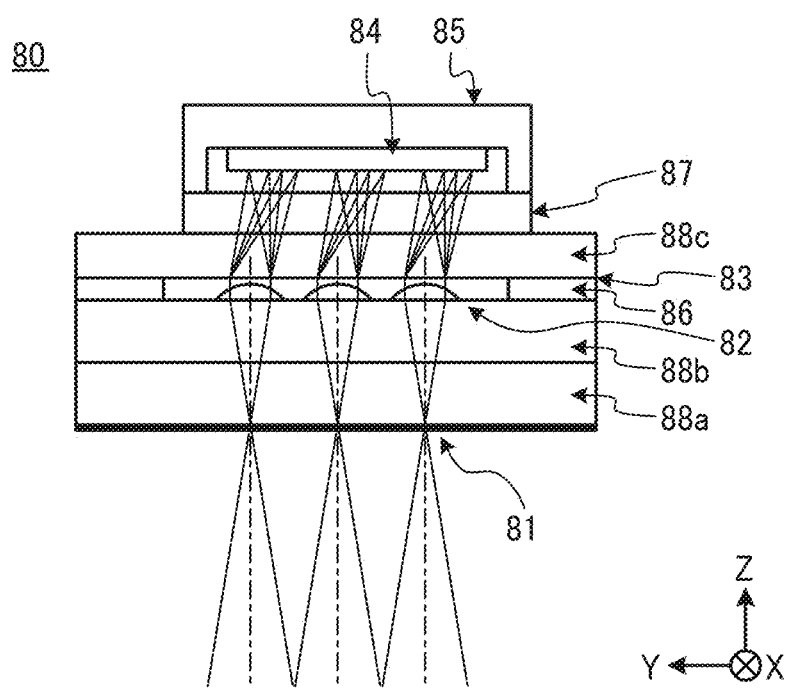
FIG. 3 is a cross-sectional view illustrating an example of the configuration of a spectroscopic device of the spectral property acquisition apparatus according to the first embodiment.

The spectroscopic device 80 has the function to disperse diffusely reflected light of the light emitted to the sheet 100 and the function to output a signal when the dispersed light is received. Referring to FIG. 3, the spectroscopic device 80 is described later in detail.

The optical system illustrated in FIG. 1 is what is called a 45/0 optical system in which the illumination light emitted from the line illumination light source 60 is incident on the sheet 100 at an approximately 45-degree tilt and the diffusely reflected light from the sheet 100 in the vertical direction is received by the spectroscopic device 80. The configuration of the optical system is not limited to that illustrated in FIG. 1. For example, it is possible to use what is called a 0/45 optical system in which the illumination light emitted from the line illumination light source 60 is incident on the sheet 100 at right angle and the light diffusing from the sheet 100 in a direction at 45 degrees is received by spectroscopic device 80.

Next, referring to FIG. 3, an example of the configuration of the spectroscopic device 80 is described. FIG. 3 is a cross-sectional view illustrating an example of the configuration of the spectroscopic device 80 of the spectral property acquisition apparatus 10. FIG. 3 illustrates part of the spectroscopic device 80 on the cross section parallel to the YZ plane.

As illustrated in FIG. 3, the spectroscopic device 80 includes a pinhole array 81, a lens array 82, a diffraction element 83, and an imaging element 84. The spectroscopic device 80 further includes a package 85, a spacer 86, a cover glass 87, and a glass substrate 88a to a glass substrate 88c.

The pinhole array 81 includes pinholes that are holes allowing the passage of the light reflected from the sheet 100. The pinhole is provided at the imaging position where the light entering from the reduction imaging lens 70 is focused in the Z-axis direction. The pinholes are arranged in an array at a predetermined interval in the Y-axis direction. In the example illustrated in FIG. 3, three pinholes are arranged in the Y-axis direction.

The pinhole array 81 is integrally formed on the transparent flat glass substrate 88a that is a light transmissive frame. A metal thin film such as nickel is vapor-deposited on the transparent glass substrate 88a and the holes corresponding to pinholes are arranged in an array so that the pinhole array 81 is formed. Each pinhole in the pinhole array 81 extracts the reflected light beam from each position of the sheet 100 in the color data acquisition area 21.

Instead of the pinhole array 81, it is possible to use a slit array including a rectangular hole or a diagonal slit array including a rectangular slit that is diagonal with respect to the Y-axis direction.

The surface of the glass substrate 88a at the opposite side of the surface on which the light reflected from the sheet 100 is incident is bounded to the surface of the transparent flat glass substrate 88b, which is a light transmissive frame. On the surface of the glass substrate 88b at the opposite side of the surface thereof bonded to the glass substrate 88a, lenses are arranged in an array at a predetermined interval in the Y-axis direction. In the example illustrated in FIG. 3, three lenses are arranged in the Y-axis direction to form the lens array 82. Each lens in the lens array 82 focuses each light beam having passed through the corresponding pinhole in the pinhole array 81 to form an image on the imaging element 84.

The lens array 82 includes a plurality of lenses 82a arranged in a row in the Y-axis direction. Each of the lenses 82a of the lens array 82 has the function to convert a diffused light beam having passed through the corresponding hole of the pinhole array 81 into a weakly diffused light beam.

A weakly diffused light beam is a diffused light beam close to a parallel light beam as compared with an incident diffused light beam. That is, it is a diffused light beam that is less diffused, i.e., weak, as compared with an incident diffused light beam.

Each of the lenses 82a included in the lens array 82 is provided at the position corresponding to the corresponding hole included in the pinhole array 81. Each of the lenses 82a has such a diameter as to receive all the light having passed through the corresponding hole. The planar shape of each of the lenses 82a may be any shape other than circular.

According to the present embodiment, the pinhole array 81 and the lens array 82 are provided with the glass substrates 88a and 88b interposed therebetween; however, this is not a limitation. The thickness of the glass substrates 88a and 88b is defined such that the optical path length between the pinhole array 81 and the lens array 82 is shorter than the object-side focal length of each of the lenses 82a of the lens array 82. In the lens array 82, portions other than the apertures for the lenses 82a may be lightproof so as to prevent stray light.

The transparent flat glass substrate 88c, which is a light transmissive frame, is provided such that the glass substrate 88c is opposed to the lens array 82 in the Z-axis direction. The glass substrate 88b and the glass substrate 88c are joined to each other with the spacer 86 interposed therebetween.

The spacer 86 is a member that provides a predetermined interval, i.e., a space, between the glass substrate 88b and the glass substrate 88c. For example, the spacer 86 is a member in which a predetermined through hole is formed in a flat portion of a metal flat plate. On the surface of the spacer 86 at the side opposed to the lens array 82, the portion of the spacer 86 not corresponding to the through hole is in contact with and is joined to the portion of the glass substrate 88b including no lenses. On the surface of the spacer 86 at the side opposed to the diffraction element 83, the portion of the spacer 86 not corresponding to the through hole is in contact with and is joined to any portion of the glass substrate 88c. Thus, a predetermined interval, i.e., a space, is formed between the glass substrate 88b and the glass substrate 88c. As the through hole, a smaller hole to house each lens of the lens array 82 or a larger hole to house a plurality of lenses may be provided.

The diffraction element 83 is provided on the surface of the glass substrate 88c opposed to the lens array 82, i.e., the surface on which the light reflected from the sheet 100 is incident. The diffraction element 83 has a saw-tooth shape formed with a predetermined interval in the glass substrate 88c. The diffraction element 83 functions as a diffraction grating that diffracts and disperses the incident light. The diffraction element 83 disperses the light beam having passed through each lens of the lens array 82. A diffraction image corresponding to each light beam is formed on the imaging element 84.

As the diffraction element 83, a blazed diffraction grating having the improved diffraction efficiency for the first-order diffraction light may be used. The use of a blazed diffraction grating as the diffraction element 83 may improve the diffraction efficiency for the first-order diffraction light; thus, the light use efficiency of the optical system may be increased. This makes it possible to acquire sufficiently high-quality signals in a shorter time and to shorten the time it takes to acquire the spectral property.

The imaging element 84 is a line sensor in which a plurality of pixels is arranged in the Y-axis direction. Light receiving elements at different positions receive diffraction images formed by the lens array 82 and the diffraction element 83 so that the imaging element 84 acquires the amount of incident light in a predetermined wavelength band. As the imaging element 84, for example, a metal oxide semiconductor device (MOS), a complementary metal oxide semiconductor device (CMOS), or a charge coupled device (CCD) may be used.

Figure 4:
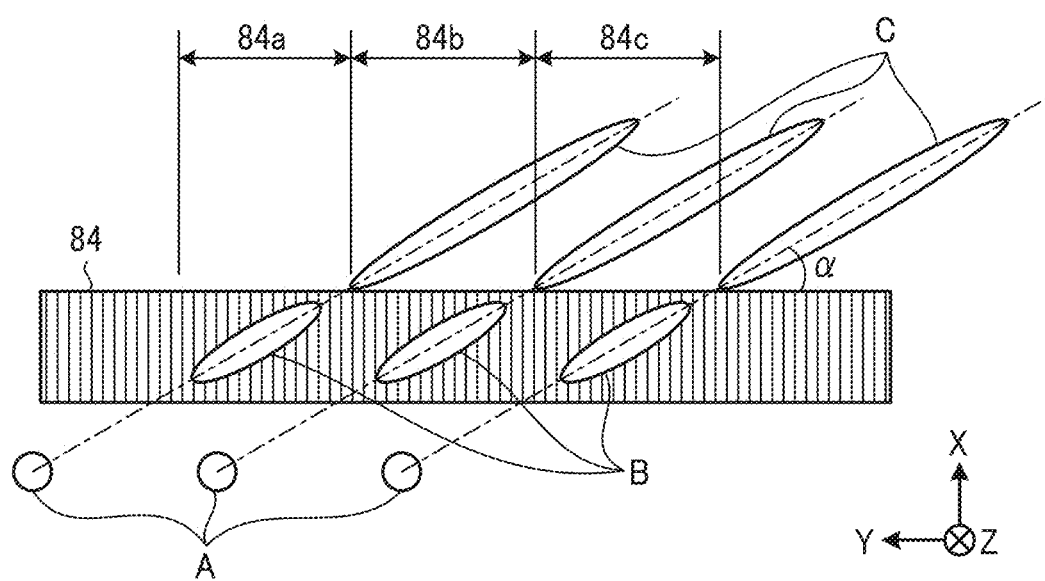
FIG. 4 is a diagram illustrating diffraction images and light reception by an imaging element in the spectral property acquisition apparatus according to the first embodiment.

The diffraction axis of the diffraction element 83 is tilted with an angle $\alpha$ with respect to the Y-axis direction. As illustrated in FIG. 4, a diffraction image tilted with the angle $\alpha$ with respect to the X-axis direction is incident on the imaging element 84. FIG. 4 illustrates three diffraction patterns including a zero-order diffraction image A, a positive first-order diffraction image B, and a positive second-order diffraction image C and arranged side by side in the Y-axis direction. In the diffraction pattern, the imaging element 84 receives the positive first-order diffraction image B. In FIG. 4, the three first-order diffraction images by the three lenses are received at pixel areas 84a, 84b, and 84c of the imaging element 84 and converted into electrical signals. The electrical signal is output as the color data acquired by the spectroscopic device 80.

As described above, the spectral property acquisition apparatus 10 may prevent the cross talk between diffraction images and may obtain the spectral property of the sheet 100 from the positive first-order diffraction image B. In the following description, the positive first-order diffraction image B is sometimes simply referred to as a diffraction image.

Referring back to FIG. 3, the imaging element 84 is secured inside the package 85, and the hole of the package 85 is closed with the transparent cover glass 87 that is a light transmissive frame. The cover glass 87 is bonded to the surface of the glass substrate 88c at the side where the diffraction element 83 is not formed.

One of the pinholes of the pinhole array 81, the corresponding lens of the lens array 82, a part of the diffraction element 83, i.e., a light beam transmission portion by the lens, and a part of the pixel array of the imaging element 84 optically function as a spectroscope. The part functioning as a spectroscope is sometimes referred to as a spectroscopic sensor below.

Although FIGS. 3 and 4 illustrate the three spectroscopic sensors, this is not a limitation, and a larger number of spectroscopic sensors may be provided. For example, in a case where the imaging element 84 has 1024 pixels and the number of pixels in the above-described part of the pixel array is 10 pixels, 102 spectroscopic sensors may be configured. The spectroscopic sensors are arranged in the Y-axis direction, i.e., in the sheet conveying direction. The spectroscopic sensors are an example of "a plurality of spectroscopic sensors arranged in a conveying direction of an object".

In the spectroscopic optical system included in the spectroscopic device 80, the relative misalignment between the imaging element 84 and the diffraction image formed by the pinhole array 81, the lens array 82, and the diffraction element 83 largely affects the accuracy with which the spectral property is acquired. According to the present embodiment, in order to suppress the above-described misalignment, the pinhole array 81, the lens array 82, the diffraction element 83, and the imaging element 84 are laminated and bonded to each other so as to be stacked in the optical axis of the reduction imaging lens 70.

Figure 5:
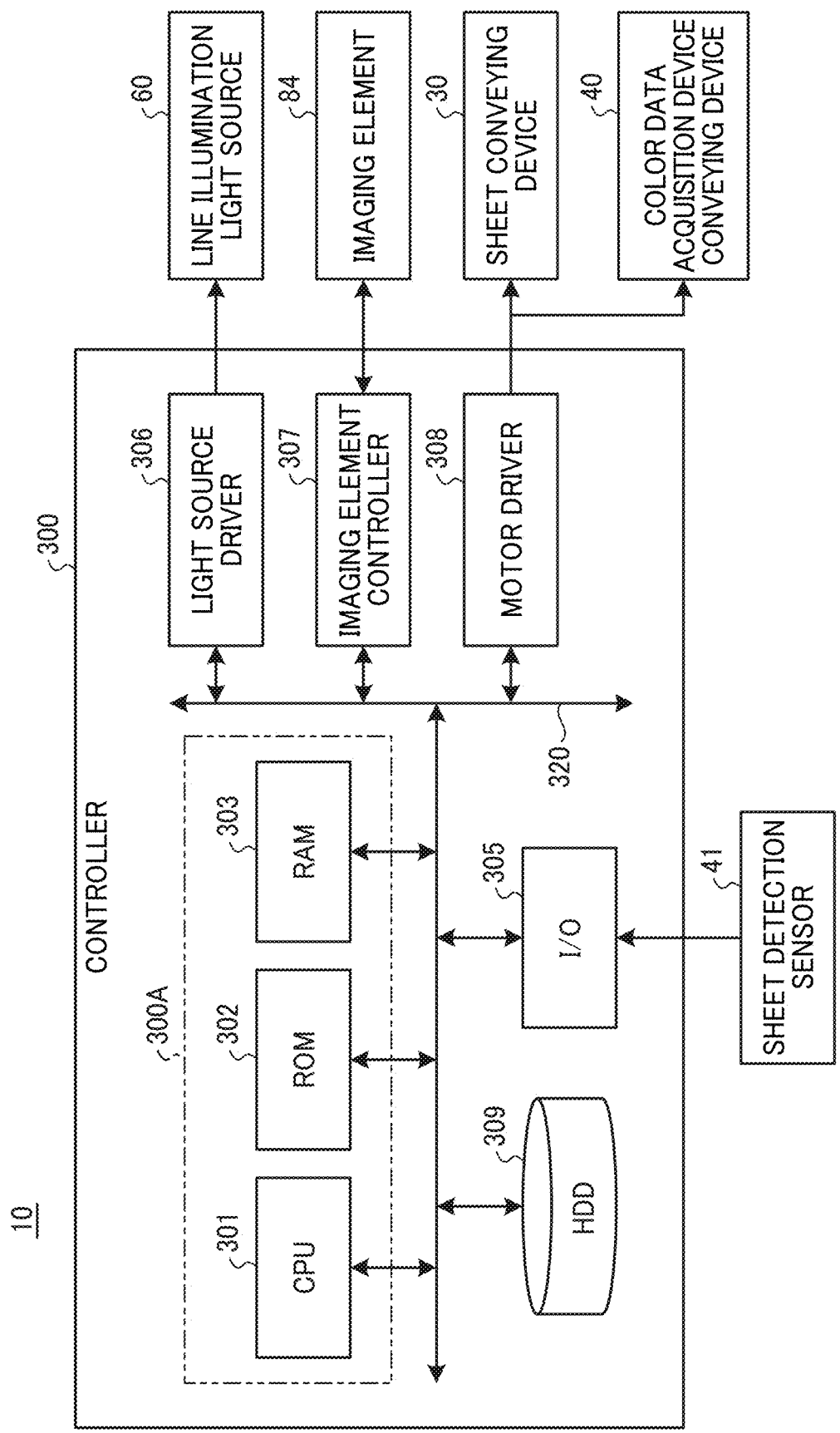
FIG. 5 is a block diagram illustrating an example of the hardware configuration of the spectral property acquisition apparatus according to the first embodiment.

Referring to FIG. 5, an example of the controller 300 of the spectral property acquisition apparatus 10 is schematically described below. FIG. 5 is a block diagram illustrating an example of the hardware configuration of the spectral property acquisition apparatus 10.

The controller 300 includes a main controller 300A, an input/output (I/O) 305, a light source driver 306, an imaging element controller 307, a motor driver 308, and a hard disk drive (HDD) 309.

The main controller 300A includes a central processing unit (CPU) 301, a read only memory (ROM) 302, and a random access memory (RAM) 303. The CPU 301, the ROM 302, and the RAM 303 are electrically connected to one another via a system bus 320.

The CPU 301 integrally controls the operation of the spectral property acquisition apparatus 10. The CPU 301 executes a program stored in the ROM 302, or the like, by using the RAM 303 as a work area to control the overall operation of the spectral property acquisition apparatus 10 so as to perform various functions described later. The HDD 309 stores acquired color data, etc.

The I/O 305 receives detection signals, and the like, from the sheet detection sensor 41.

The light source driver 306 is electric circuitry that outputs a drive signal, such as a drive voltage, for causing the line illumination light source 60 to emit light in accordance with an input control signal.

The imaging element controller 307 controls the imaging by the imaging element 84 included in the spectroscopic device 80 in accordance with an input control signal. The imaging data by the imaging element 84 is transmitted to and stored in the HDD 309 as color data via the imaging element controller 307.

The motor driver 308 is electric circuitry that outputs a drive signal, such as a drive voltage, to the respective motors for operating the sheet conveying devices 30, 31, and 32 and the color data acquisition device conveying device 40 in accordance with an input control signal.

Here, the conveyance of the sheet 100 in the Y-axis direction is described.

Figure 6A:
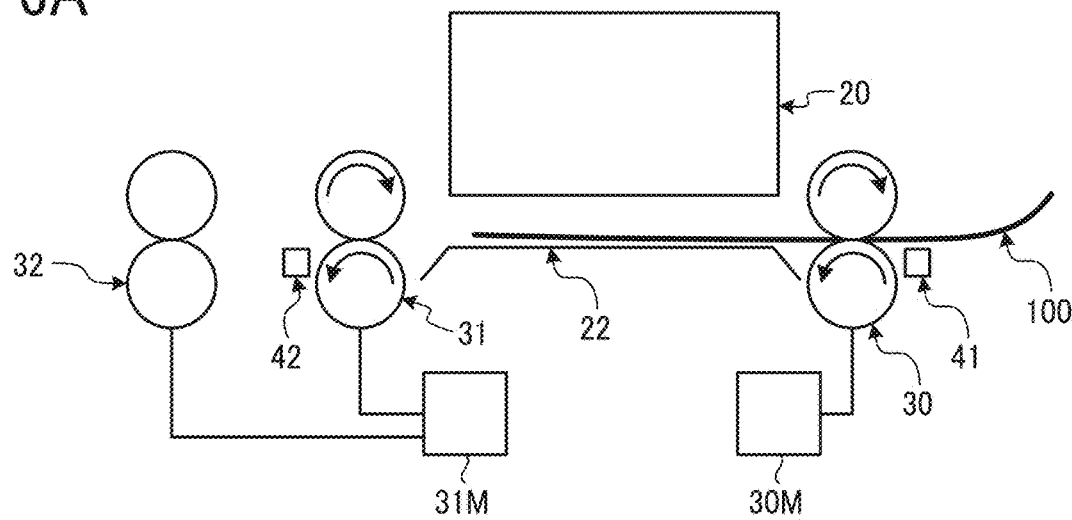
FIGS. 6A to 6C are diagrams illustrating an example of the procedure for conveying a sheet in a Y-axis direction according to the first embodiment.
Figure 6B:
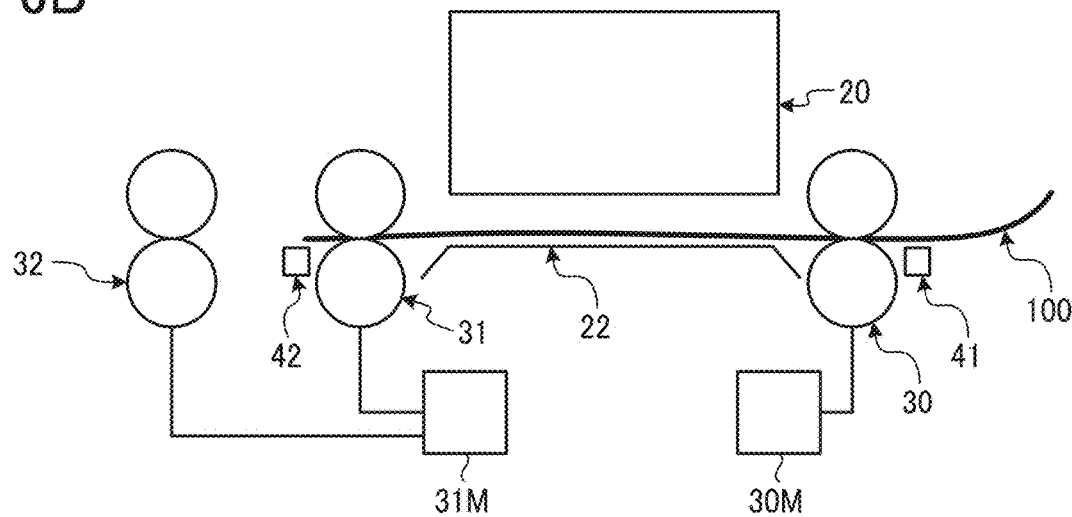
Figure 6C:
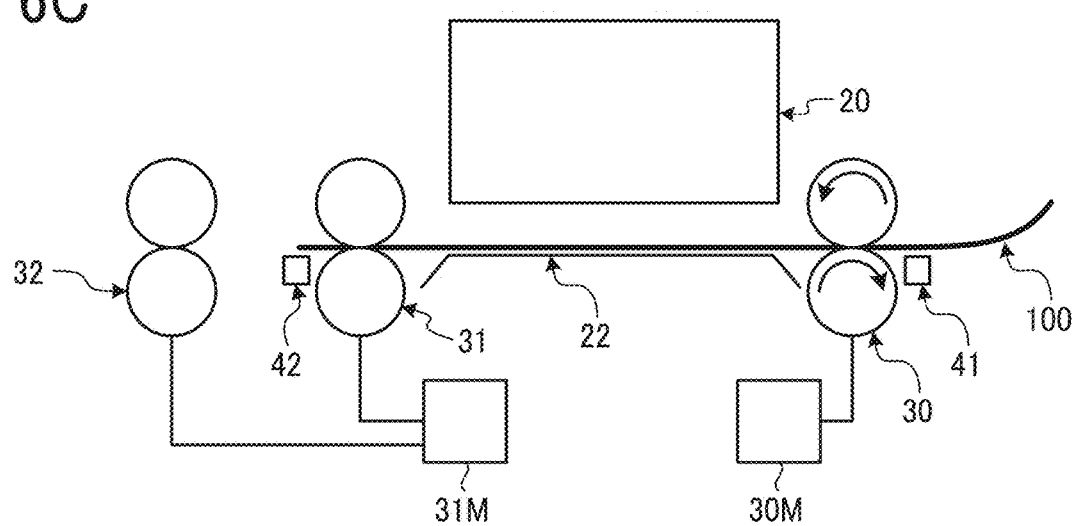

FIGS. 6A to 6C are diagrams illustrating an example of the procedure for conveying the sheet 100 in the Y-axis direction. As illustrated in FIG. 6A, the main controller 300A detects that the sheet 100 is positioned in front of the color data acquisition area 21 for the color data acquisition device 20 based on the output of the sheet detection sensor 41. After the detection, the main controller 300A controls the sheet conveying devices 30 and 31 by using the motor driver 308 so as to start to convey the sheet 100. Then, based on the output of the sheet detection sensor 42, the main controller 300A causes the sheet conveying devices 30 and 31 to be stopped.

As illustrated in FIG. 6B, at this point, the sheet 100 is not in close contact with the measurement reference surface 22 as there is no tension between the sheet conveying device 30 and the sheet conveying device 31.

Next, as illustrated in FIG. 6C, the main controller 300A controls the sheet conveying device 30 by using the motor driver 308 so as to rotate backward by a predetermined amount in such a direction to move back the sheet 100 and then stop the sheet conveying device 30 while the sheet conveying device 31 is stopped.

As illustrated in FIG. 6C, at this point, as there is tension applied to the sheet 100 between the sheet conveying device 30 and the sheet conveying device 31, the sheet 100 is secured without looseness or creases so that the sheet 100 is in close contact with the measurement reference surface 22. Thus, the main controller 300A controls at least a part of the sheet conveying devices 30, 31, and 32 so as to apply predetermined tension to the sheet 100, which is the object, in the color data acquisition area 21 for acquiring the color data on the sheet 100.

The amount of backward rotation is usually set to several percent or less of the distance between the sheet conveying device 30 and the sheet conveying device 31 enough to eliminate the looseness or creases of the sheet 100.

Although the sheet conveying devices 30 and 31 are coupled to different driving motors, the above-described operation may be performed with a single driving motor by using an electromagnetic clutch or a reversing gear.

The controller 300 provides the function to execute estimate calculation of the spectral property of the sheet 100 by using a conversion matrix based on acquired color data.

Some or all of the control processes performed by the CPU may be provided by electronic circuitry such as a field-programmable gate array (FPGA) or an application specific integrated circuit (ASIC).

Figure 7:
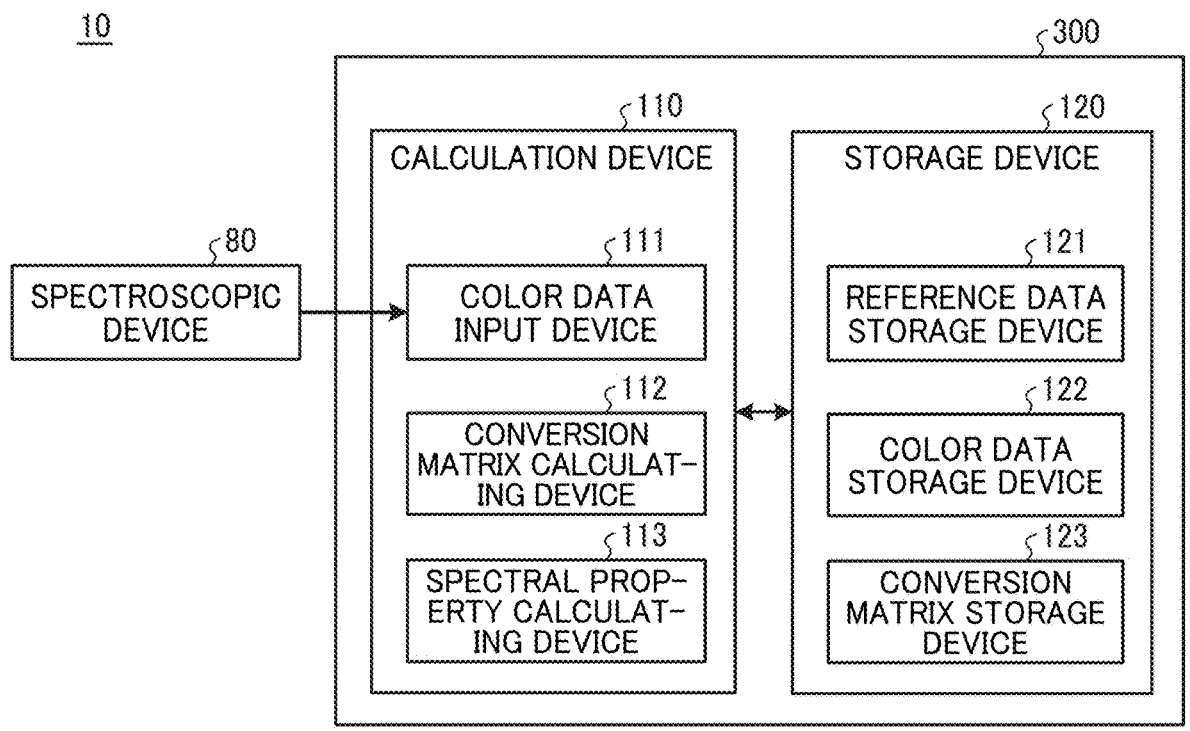
FIG. 7 is a block diagram illustrating an example of the functional configuration for the spectral property acquisition apparatus to execute estimate calculation of the spectral property according to the first embodiment.

FIG. 7 is a block diagram illustrating an example of the functional configuration for the spectral property acquisition apparatus 10 to execute estimate calculation of the spectral property.

The controller 300 includes a calculation device 110 and a storage device 120. The calculation device 110 includes a color data input device 111, a conversion matrix calculating device 112, and a spectral property calculating device 113. The storage device 120 includes a reference data storage device 121, a color data storage device 122, and a conversion matrix storage device 123. The function of each device of the calculation device 110 is described below. Furthermore, the method for estimate calculation of the spectral reflectivity distribution as the spectral property of the sheet 100 is described below.

In the spectral property acquisition apparatus 10, when the line illumination light source 60 emits light to the sheet 100, the imaging element 84 of the spectroscopic device 80 receives a diffraction image and then outputs an electrical signal so that the color data input device 111 of the controller 300 receives color data.

After the color data is input, the spectral property calculating device 113 calculates the spectral property of the sheet 100 from the color data by using the conversion matrix previously stored in the conversion matrix storage device 123. The spectral property calculating device 113 is an example of a "spectral property calculating device".

A description is given of the method implemented by the spectral property calculating device 113 to estimate and calculate the spectral reflectivity distribution as the spectral property from the color data from one of the spectroscopic sensors included in the spectroscopic device 80 according to the present embodiment. The spectral property may be obtained in a method different from the method described below.

Color data $v_i$ (i=1 to N) is obtained from N pixels constituting one of the spectroscopic sensors in the spectroscopic device 80 and is stored in a matrix V. A matrix r storing the spectral reflectivity in each wavelength band (e.g., each of the 31 wavelength bands at a 10-nm pitch in the range of 400 nm to 700 nm) is expressed by the following Equation (1) using the matrix V and a conversion matrix G. The conversion matrix G is an example of a "preset conversion matrix".

$$R = Gv \quad \text{[Equation (1)]}$$

The conversion matrix G is obtained by minimizing the squared norm $\|\cdot\|^2$ of an error by using the least-square method based on the matrix R storing the spectral reflectivity distribution of multiple (n) known reference samples and the matrix V storing the color data v of the spectroscopic sensor obtained from the reference sample, as illustrated in the following Equations (2) to (4).

$$R = [r1, r2, \ldots, rn] \quad \text{[Equation (2)]}$$

$$V = [v1, v2, \ldots, vn] \quad \text{[Equation (3)]}$$

$$e = |R - GV|^2 \rightarrow \min \quad \text{[Equation (4)]}$$

The conversion matrix G in a regression expression from V to R, where V is an explanatory variable and R is an objective variable, is obtained by the following Equation (5) using the Moore-Penrose generalized inverse matrix that gives the solution of the least square norm of the matrix V, for example. In Equation (5), the superscript T represents the transpose of matrix, and the superscript −1 represents an inverse matrix.

$$G = RV^T(VV^T)^{-1} \quad \text{[Equation (5)]}$$

In the spectral property acquisition apparatus 10, an acquisition result of the spectral reflectivity of a reference sample is previously stored in the reference data storage device 121 of the controller 300.

The conversion matrix calculating device 112 generates a matrix $V_{ref}$ based on the color data obtained from the reference sample by the spectral property acquisition apparatus 10. The conversion matrix calculating device 112 generates a matrix $R_{ref}$ from the spectral reflectivity distribution of the reference sample stored in the reference data storage device 121. The conversion matrix calculating device 112 calculates the conversion matrix G from the thus generated matrices $V_{ref}$ and $R_{ref}$ based on Equation (5).

The conversion matrix storage device 123 stores the conversion matrix G calculated by the conversion matrix calculating device 112. The color data storage device 122 of the controller 300 stores the matrix $V_{ref}$ of the color data obtained from the reference sample by the spectral property acquisition apparatus 10.

To estimate the spectral property of the sheet 100, the spectral property calculating device 113 generates a matrix $V_{exp}$ from the color data on the sheet 100 first and acquires the conversion matrix G stored in the conversion matrix storage device 123. The spectral property calculating device 113 may estimate a spectral property $R_{exp}$ of the sheet 100 based on Equation (2) by using the matrix $V_{exp}$ and the conversion matrix G.

For the above-described estimate calculation, the reference samples used for the calculation of the conversion matrix G may be selected evenly from the range (gamut) of colors reproducible in a print image in a color space such as the XYZ color system or the L*a*b* color system. The use of the conversion matrix G calculated based on the above-described reference samples makes it possible to, for example, estimate the spectral property of an image on the sheet 100 with high accuracy.

Unfortunately, it takes a lot of time and cost to create, maintain, and measure a reference sample. Therefore, the conversion matrix G may be obtained based on a smaller number of reference samples as long as the spectral property estimation accuracy may be maintained.

Figure 8:
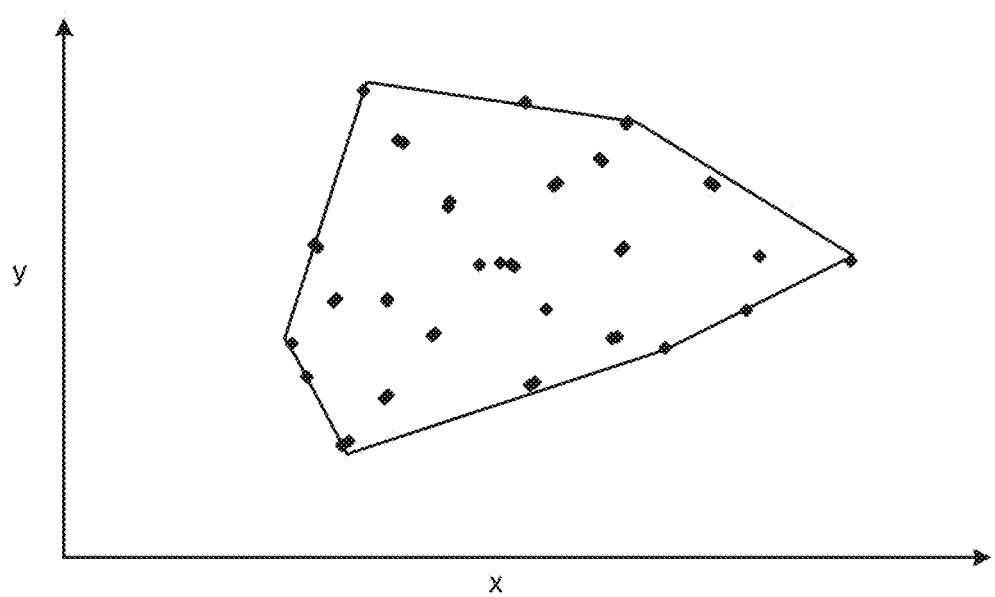
FIG. 8 is a graph illustrating an example of the xy chromaticity distribution of a reference sample and the reproducible color range of a toner image according to the first embodiment.

As an example of the reference samples, it is possible to use a 27-color toner image selected evenly from the reproducible color range of an electrophotographic image forming apparatus. FIG. 8 illustrates the xy chromaticity of each of the reference samples in 27 colors. Each point indicates the xy chromaticity of a reference sample, and the solid line indicates the reproducible color range of a toner image. As seen from FIG. 8, the reference samples are selected evenly from the reproducible color range of a toner image.

In the spectral property acquisition apparatus 10, the conversion matrix storage device 123 previously stores the conversion matrix G calculated by the conversion matrix calculating device 112 using the reference samples selected as described above.

Next, referring to FIGS. 9A to 9D, the operations of the color data acquisition device 20 and the sheet 100 during color data acquisition by the spectral property acquisition apparatus 10 is described. FIGS. 9A to 9D are plan views illustrating the sheet 100 when seen in the +Z-axis direction during color data acquisition. FIGS. 9A to 9D illustrate the sheet 100 at each position while the sheet 100 is conveyed in the direction indicated by an arrow, i.e., the +Y-axis direction.

In FIG. 9A, the color data acquisition device 20 is located at the end of the sheet 100 in the −X-axis direction and in the +Y-axis direction. The color data acquisition device 20 is continuously conveyed from the position illustrated in FIG. 9A in a direction 20a indicated by a white arrow. The continuous conveyance is what is called scan drive. While the color data acquisition device 20 is continuously conveyed, the spectroscopic device 80 acquires the color data on the sheet 100 in the color data acquisition area 21 at a predetermined time interval. The predetermined time interval is, for example, the frame period of the imaging element 84. At this point, the conveyance of the sheet 100 is stopped. After the spectroscopic device 80 is conveyed to the end of the sheet 100 in the +X-axis direction, the conveyance of the color data acquisition device 20 is stopped.

In the location of the sheet 100 and the sheet detection sensor 41 as illustrated in FIG. 9A, it is detected based on the output of the sheet detection sensor 41 that the sheet 100 is located in the color data acquisition position.

FIG. 9B illustrates the sheet 100 that has been conveyed by a predetermined distance in the Y-axis direction from the position illustrated in FIG. 9A. The predetermined distance corresponds to, for example, the color data acquisition range of the spectroscopic device 80 in the Y-axis direction. The color data acquisition device 20 is located at the end of the sheet 100 in the +X-axis direction.

The color data acquisition device 20 is continuously conveyed in a direction 20b indicated by a white arrow from the position illustrated in FIG. 9B. While the color data acquisition device 20 is continuously conveyed, the spectroscopic device 80 acquires the color data on the sheet 100 in the color data acquisition area 21 at a predetermined time interval. As is the case with the above, the conveyance of the sheet 100 is stopped at this point. After the color data acquisition device 20 is conveyed to the end of the sheet 100 in the −X-axis direction, the conveyance of the color data acquisition device 20 is stopped.

As illustrated in FIGS. 9C and 9D, the color data acquisition device 20 acquires the color data on the sheet 100 in the color data acquisition area 21 during the same operation.

In the location of the sheet 100 and the sheet detection sensor 41 as illustrated in FIG. 9D, it is detected based on the output of the sheet detection sensor 41 that the sheet 100 has moved away from the color data acquisition position.

During the operations illustrated in FIGS. 9A to 9D, the color data on the entire area of the sheet 100 is acquired. In the above description, the color data acquisition device 20 is conveyed in the X-axis direction four times to acquire the color data on the entire area of the sheet 100; however, the color data acquisition device 20 may be conveyed any number of times depending on the size of the sheet 100.

Figure 10:
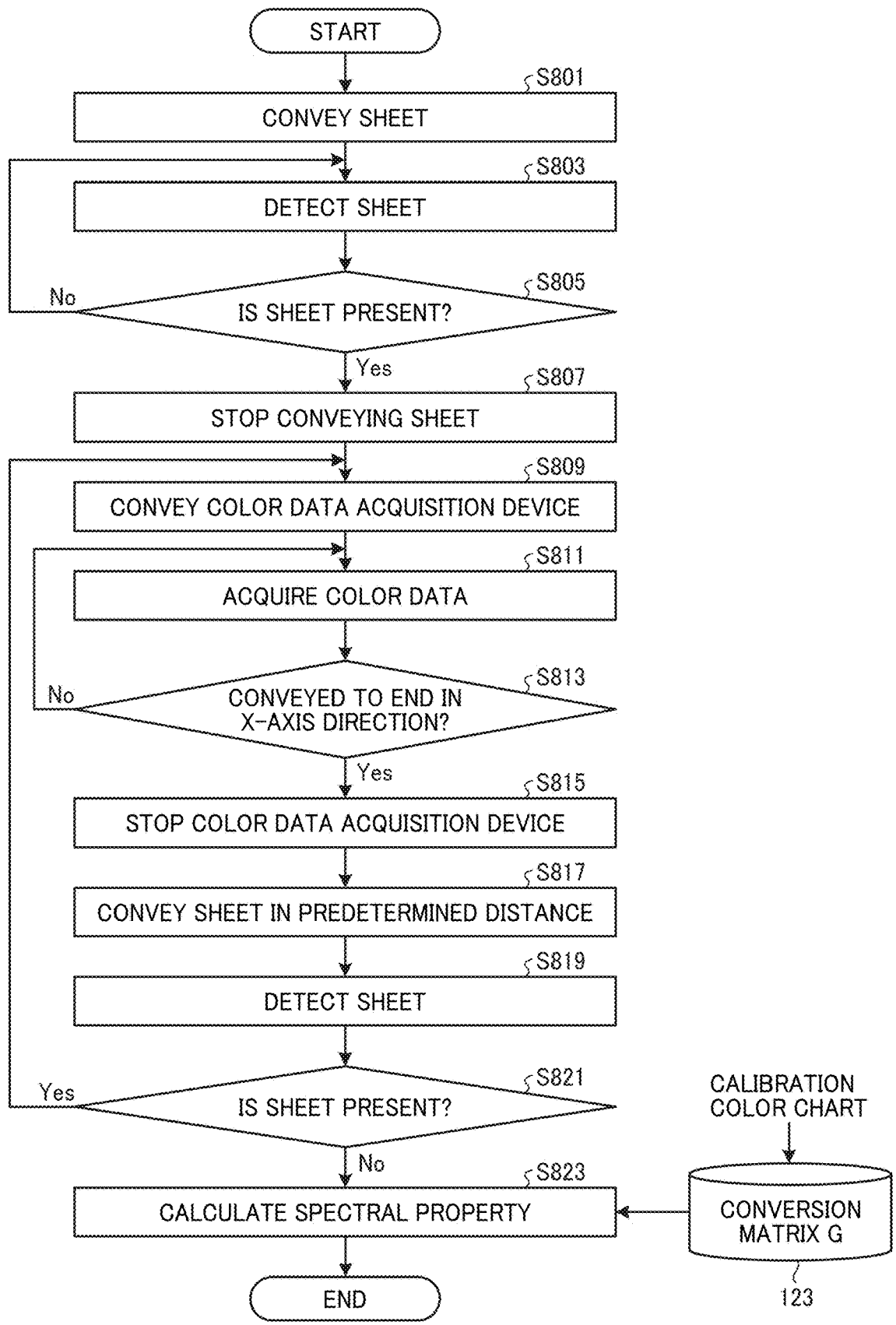
FIG. 10 is a flowchart illustrating an example of a spectral property acquisition process performed by the spectral property acquisition apparatus according to the first embodiment.

Next, referring to the flowchart in FIG. 10, an example of the spectral property acquisition process performed by the spectral property acquisition apparatus 10 is described.

First, in step S801, the sheet conveying devices 30, 31, and 32 convey the sheet 100 in the Y-axis direction.

Subsequently, in step S803, the sheet detection sensor 41 acquires the detection signal indicating whether the sheet 100 is located at the color data acquisition position and outputs the detection signal to the controller 300.

In step S805, the controller 300 determines whether the sheet 100 is located in the color data acquisition position based on the detection signal of the sheet detection sensor 41.

When it is determined that the sheet 100 is located in the color data acquisition position in step S805 (Yes in step S805), the sheet conveying devices 30, 31, and 32 stop conveying the sheet 100 in the Y-axis direction in step S807. Conversely, when it is determined that the sheet 100 is not located in the color data acquisition position in step S805 (No in step S805), the process returns to step S803.

In step S809, the color data acquisition device conveying device 40 continuously conveys the color data acquisition device 20 in the X-axis direction.

In step S811, the color data acquisition device 20 acquires color data at a predetermined time interval. That is, the imaging element 84 of the color data acquisition device 20 captures a diffraction image obtained from the reflected light in the color data acquisition area 21 and output color data.

In step S813, the controller 300 determines whether the color data acquisition device 20 has been conveyed to the end in the X-axis direction. That is, it is determined whether the color data in the entire area in the X-axis direction has been acquired.

When it is determined that the color data acquisition device 20 has been conveyed to the end in the X-axis direction in step S813 (Yes in step S813), the color data acquisition device conveying device 40 stops conveying the color data acquisition device 20 in step S815. Conversely, when it is determined that the color data acquisition device 20 has not been conveyed to the end in the X-axis direction in step S813 (No in step S813), the process returns to step S811.

In step S817, the sheet conveying devices 30, 31, and 32 convey the sheet 100 in the Y-axis direction in a predetermined distance.

In step S819, the sheet detection sensor 41 acquires the detection signal indicating whether the sheet 100 is located in the color data acquisition position and outputs the detection signal to the controller 300.

In step S821, the controller 300 determines whether the sheet 100 is located in the color data acquisition position based on the detection signal of the sheet detection sensor 41.

When it is determined that the sheet 100 is located in the color data acquisition position in step S821 (Yes in step S821), the process returns to step S809 so that the color data acquisition is continued. Conversely, when it is determined that the sheet 100 is not located in the color data acquisition position in step S821 (No in step S821), the spectral property calculating device 113 uses the conversion matrix G stored in the conversion matrix storage device 123 based on the acquired color data to calculate the spectral property of the sheet 100 in step S823.

Thus, the spectral property acquisition process by the spectral property acquisition apparatus 10 ends.

As described above, the spectral property acquisition apparatus 10 conveys the sheet 100 and conveys the color data acquisition device 20 including the spectroscopic sensors, which are arranged in the conveying direction of the sheet 100, in the width direction of the sheet 100 to acquire the color data on the entire area of the sheet 100.

Next, the calibration function of the conversion matrix G included in the spectral property acquisition apparatus 10 according to the present embodiment is described. For the calibration, the calibration color chart 50 is used. The conversion matrix stored in the conversion matrix storage device 123 is calibrated by using the color data acquired from the calibration color chart 50 by the color data acquisition device 20. The calibration color chart 50 is an example of a "calibration color chart having a color chart whose spectral property is known".

The areas with different colors in the calibration color chart 50 may be selected evenly from the reproducible color range, i.e., the gamut, of an image in a color space such as the XYZ color system or the L*a*b color system.

As is the case with the reference samples described above, it takes a lot of time and cost to generate, maintain, and measure the color areas in the calibration color chart 50. Therefore, a small number of color areas are often used as long as the spectral property estimation accuracy may be maintained, and several to several tens of colors selected from the reproducible color range for image formation are often used. For the high-accuracy measurement with the improved spectral property estimation accuracy, however, areas in several hundred to several thousand colors are used. This is noticeable, for example, in the case of use of a multicolored material in four or more colors due to the improvement in the image quality with, for instance, an electrophotographic system or an inkjet system. The multicolor described here refers to, for example, orange, green, white, clear, or fluorescent color in addition to yellow, magenta, cyan, and black.

Figure 11:
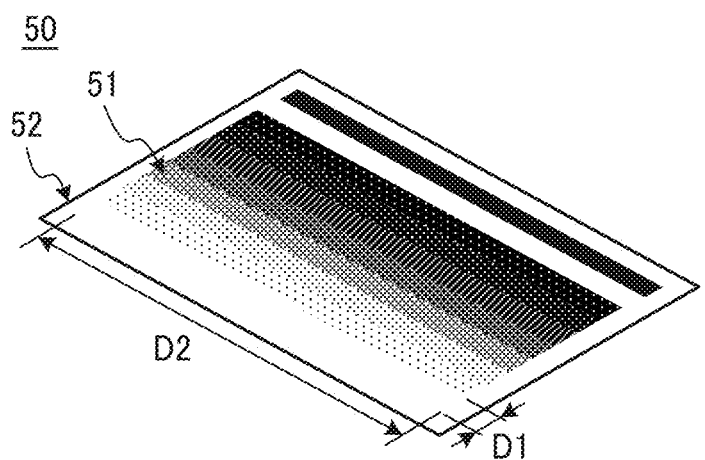
FIG. 11 is a diagram illustrating an example of a calibration color chart of the spectral property acquisition apparatus according to the first embodiment.

The present embodiment uses the reference samples in several to several thousand colors selected from the reproducible color range for image formation by the image forming apparatus. FIG. 11 is a diagram illustrating an example of the calibration color chart 50 including the reference samples.

As illustrated in FIG. 11, the calibration color chart 50 includes a plate member 52 formed by cutting a metal material such as aluminum, and a plurality of color charts 51 on the upper surface of the plate member 52. The color charts 51 are strip members that are colored with a tone-adjusted coating material. A strip may have any width D1 and any length D2 as long as the width D1 and the length D2 are larger than the range of color data that may be acquired by the spectroscopic device 80 at once. For example, when the color data acquisition area is 1 mm in the width direction and 100 mm in the conveying direction, the width D1 of the strip may be 1 mm or more and the length D2 may be 100 mm or more. The color charts 51 are arranged on the plate member 52 in the width direction such that the longitudinal direction of the color charts 51 is substantially parallel to the conveying direction to form the calibration color chart 50.

The color charts 51 may be directly applied to and formed on the plate member 52. Alternatively, a color image formed on a strip-shaped sheet may be attached as the color charts 51 to the plate member 52. The plate member 52 is large enough to prevent the color charts 51 from being touched when the plate member 52 is held or conveyed. If the color charts 51 have a large number of colors, a plurality of the plate members 52 are provided.

Figure 12:
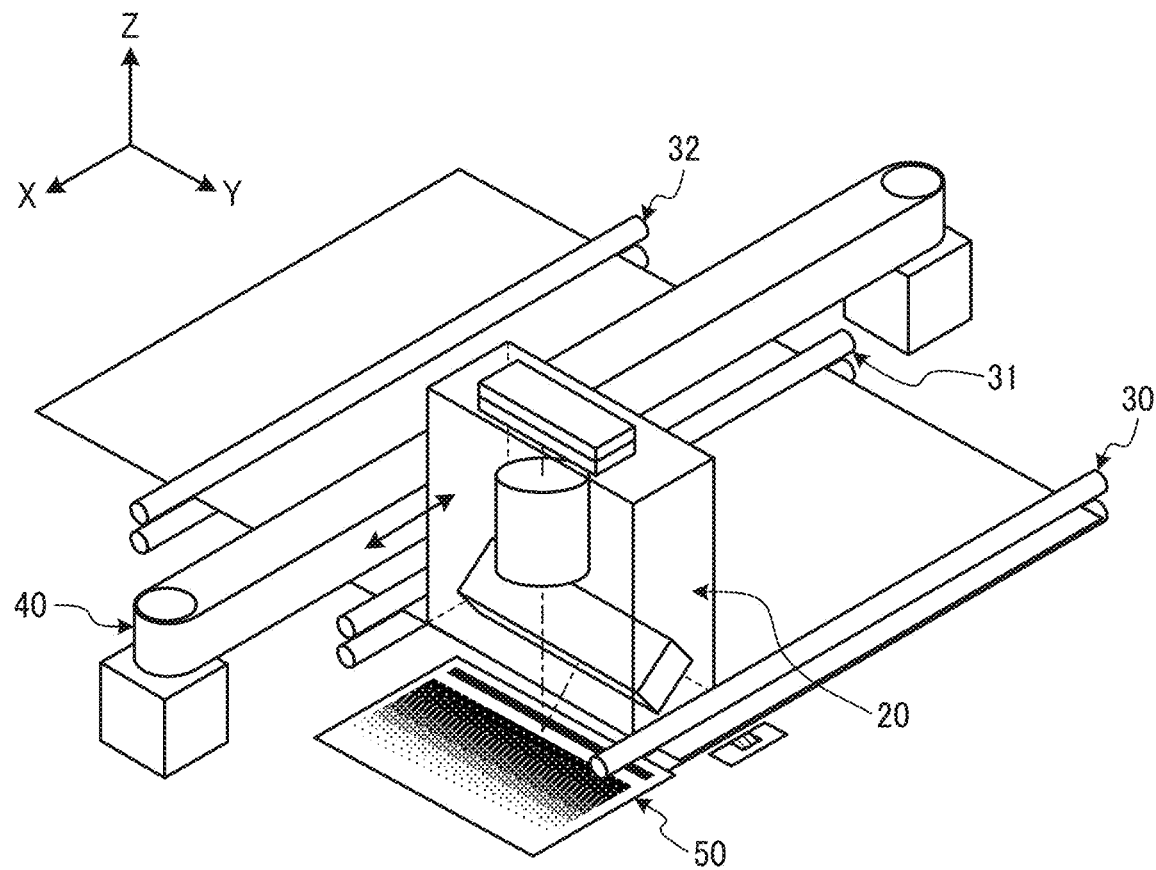
FIG. 12 is a perspective view illustrating an example of the arrangement during the calibration by the spectral property acquisition apparatus according to the first embodiment.

As illustrated in FIG. 12, the calibration color chart 50 is located adjacent to the sheet 100 in the width direction, the sheet 100 being disposed within the range in which the color data acquisition device 20 is conveyed. That is, the calibration color chart 50 is located in an area other than the area where the sheet 100 is placed within the range in which the color data acquisition device conveying device 40 conveys the color data acquisition device 20. The color data acquisition device 20 is conveyed to the position of the calibration color chart 50 so that calibration using the calibration color chart 50 may be performed.

The spectral property of each color chart included in the calibration color chart 50 is previously measured by using a high-accuracy spectroscope, and a matrix $R_1$ representing the spectral property of an area is previously stored in the reference data storage device 121.

Next, the method implemented by the conversion matrix calculating device 112 to calibrate the conversion matrix G is described. Each of the spectroscopic sensors included in the color data acquisition device 20 has the conversion matrix G. The conversion matrix G of each spectroscopic sensor is calibrated by the conversion matrix calculating device 112. The conversion matrix calculating device 112 is an example of a "conversion matrix calibrating device".

To calibrate the conversion matrix G, the color data acquisition device 20 is moved to the position of the calibration color chart 50. The line illumination light source 60 irradiates the calibration color chart 50 with light, and each of the spectroscopic sensors of the color data acquisition device 20 captures a diffraction image and outputs color data.

The conversion matrix calculating device 112 first acquires the matrix $R_{ref}$ representing the previously measured spectral property of a reference sample and the matrix $R_1$ representing the spectral property of the color charts 51 of the calibration color chart 50 from the reference data storage device 121. The conversion matrix calculating device 112 then adds the matrix $R_1$ to the matrix $R_{ref}$ to obtain a matrix $R_{rev}$. The conversion matrix calculating device 112 adds a matrix $V_1$ of the color data obtained from the color charts 51 to the matrix $V_{ref}$ of the color data obtained from a reference sample stored in the color data storage device 122 to obtain a matrix $V_{rev}$.

The conversion matrix calculating device 112 uses the thus obtained matrices $R_{rev}$ and $V_{rev}$ to obtain a conversion matrix $G_1$ based on Equation (5) and stores the calibrated conversion matrix $G_1$ in the conversion matrix storage device 123.

Figure 13:
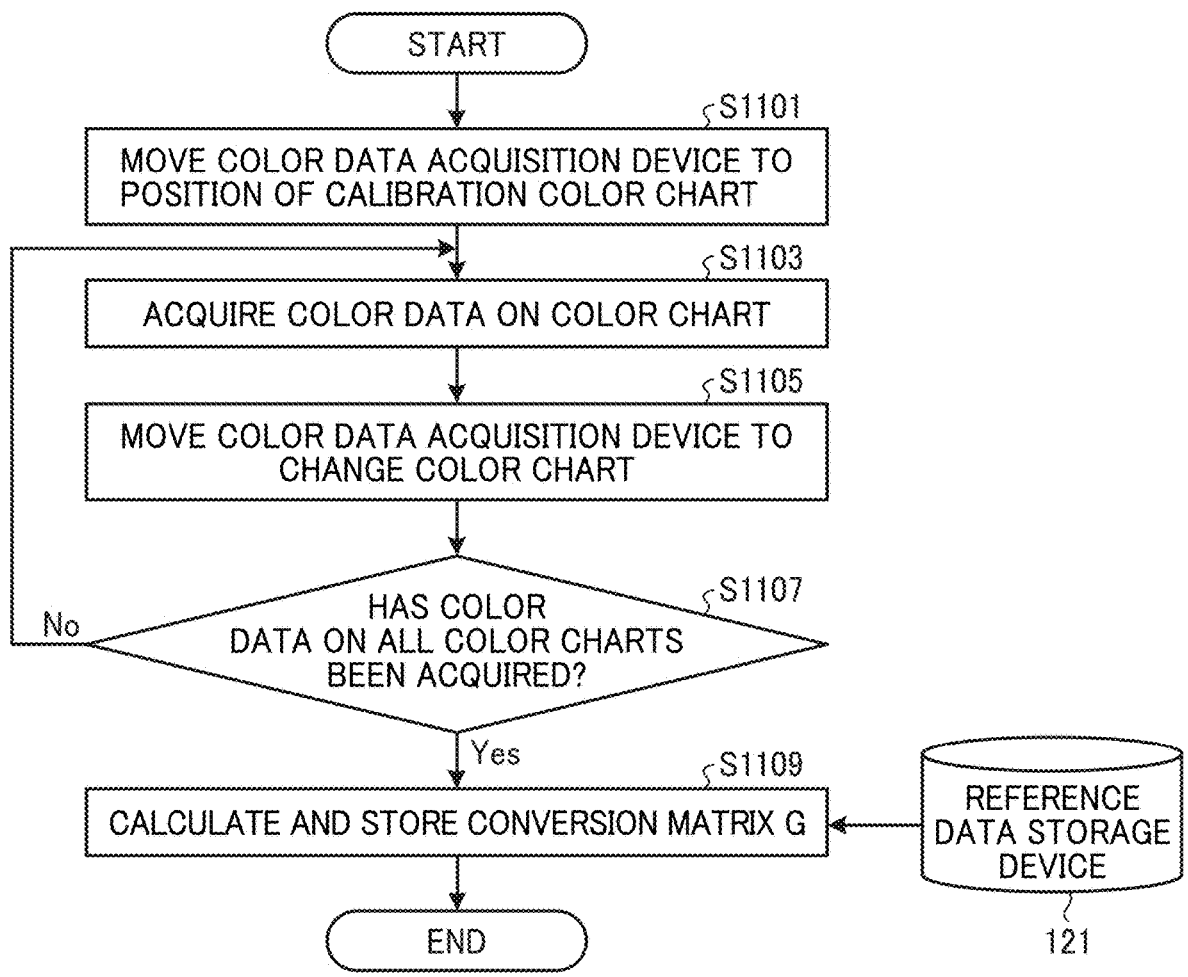
FIG. 13 is a flowchart illustrating an example of the process performed by the spectral property acquisition apparatus to calibrate a conversion matrix according to the first embodiment.

FIG. 13 is a flowchart illustrating an example of the process performed by the spectral property acquisition apparatus 10 to calibrate the conversion matrix as described above.

First, in step S1101, the color data acquisition device conveying device 40 conveys the color data acquisition device 20 in the width direction of the sheet 100 to move the color data acquisition device 20 to the position of the color chart at the extreme end of the calibration color chart 50. For example, as illustrated in in FIG. 12, the color chart at the extreme end is the color chart located at the extreme end in the −X-axis direction among the color charts.

In step S1103, the color data acquisition device 20 acquires the color data on the color chart.

In step S1105, the color data acquisition device conveying device 40 conveys the color data acquisition device 20 in the width direction to change the color chart for which the color data is acquired.

In step S1107, the controller 300 determines whether the color data on all the color charts has been acquired.

Figures 14, 15:
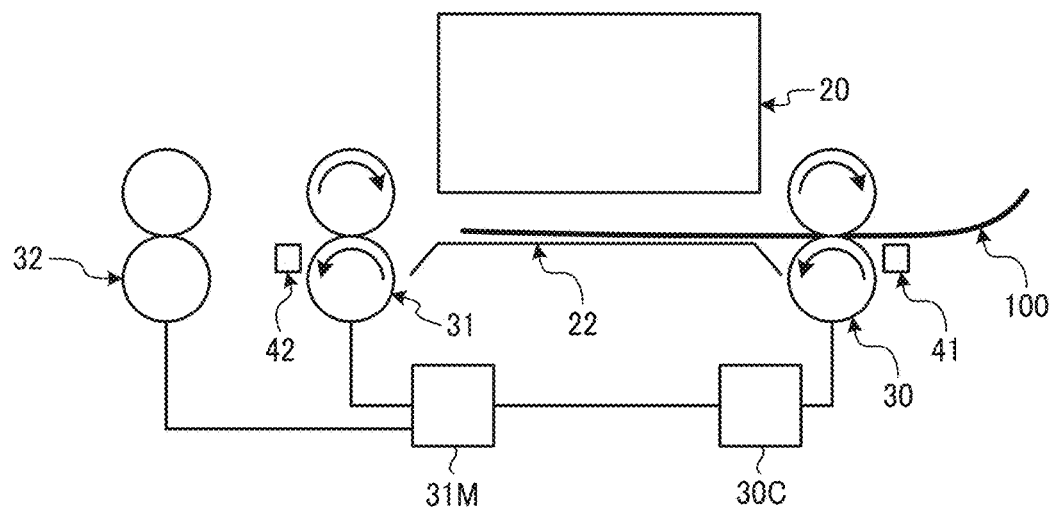
FIG. 14 is a table illustrating an example of the spectral property acquired for each color chart by each spectroscopic sensor in the spectral property acquisition apparatus according to the first embodiment.
FIG. 15 is a diagram illustrating an example of the configuration in the periphery of the sheet conveying devices of the spectral property acquisition apparatus according to a second embodiment of the present invention.

When it is determined that the color data on all the color charts have been acquired in step S1107 (Yes in step S1107), the conversion matrix calculating device 112 obtains the conversion matrix $G_1$ based on Equation (5) and stores the calibrated conversion matrix $G_1$ in the conversion matrix storage device 123 in step S1109. FIG. 14 is a table illustrating an example of the list of spectral properties acquired for each color chart by each spectroscopic sensor $80_m$ (e.g., spectroscopic sensors $80_1$, $80_2$, and $80_3$ in FIG. 14) in the color data acquisition device 20.

Conversely, when it is determined that the color data on all the color charts have not been acquired in step S1107 (No in step S1107), the process returns to step S1103 so that the color data on the subsequent color chart is acquired.

The conversion matrix $G_1$ is calibrated as described above. The spectral property calculating device 113 uses the calibrated conversion matrix $G_1$ so as to estimate the spectral property of the sheet 100 with higher accuracy.

As described above, according to the present embodiment, the color data acquisition device 20 is conveyed in the width direction; therefore, even when the image on the sheet 100 is wide in width, the color data on the entire area of the image may be acquired without using an expensive light source capable of emitting light to an image in the entire width at once. Thus, the spectral property acquisition apparatus 10 capable of acquiring the spectral property with high accuracy may be provided at low costs without using an expensive light source.

As the spectroscopic sensors are arranged in the conveying direction of the sheet 100, for example, the spectral property in a wide range in the conveying direction of the sheet 100 may be acquired. The conveyance of the color data acquisition device 20 in cooperation with the conveyance of the sheet 100 enables the high-speed acquisition of the spectral property in a wide area of the sheet 100.

The calibration of a conversion matrix using the calibration color chart 50 may prevent changes over time in the spectral property acquisition accuracy due to, for example, changes in the ambient temperature or the wavelength characteristics of the light source.

According to the present embodiment, the calibration color chart 50 is disposed in an area other than the area where the sheet 100 is placed within the range where the color data acquisition device 20 is conveyed. The movement of the color data acquisition device 20 may switch the spectral property acquisition mode and the calibration mode. Therefore, the calibration may be easily performed without a complicated configuration or mechanism that switches the modes. The color data acquisition device conveying device 40 that moves the color data acquisition device 20 to the position where the calibration color chart 50 is placed is an example of a "mode switching device".

As the color charts 51 are placed such that the longitudinal direction of the color charts 51 having a strip shape are parallel to the conveying direction of the sheet 100, it is possible to execute calibration for the spectroscopic sensors included in the color data acquisition device 20 at once, and thus the calibration may be performed efficiently.

As described above, according to the present embodiment, the spectral property acquisition apparatus including the spectroscopic sensors may be provided at low costs.

Furthermore, the spectral property acquisition apparatus that executes two-dimensional scanning with the spectroscopic sensors without creases or looseness of a recording medium even in a large distance between the nip rollers may be provided at low costs.

Second Embodiment

Next, a second embodiment of the present invention is described.

The second embodiment is different from the first embodiment in that the sheet conveying devices 30, 31, and 32 are coupled to the common driving motor 31M. In the following description of the second embodiment, the description of the same parts as those in the first embodiment is omitted, and different parts from those in the first embodiment are described.

FIG. 15 is a diagram illustrating an example of the configuration in the periphery of the sheet conveying devices 30, 31, and, 32 of the spectral property acquisition apparatus 10 according to the second embodiment. As illustrated in FIG. 15, the sheet conveying devices 30, 31, and 32 are coupled to the common driving motor 31M. The sheet conveying device 30 is coupled to a clutch 30C that turns on/off the transmission of the driving force from the sheet conveying device 31.

Here, the conveyance of the sheet 100 in the Y-axis direction is described.

Figure 16A:
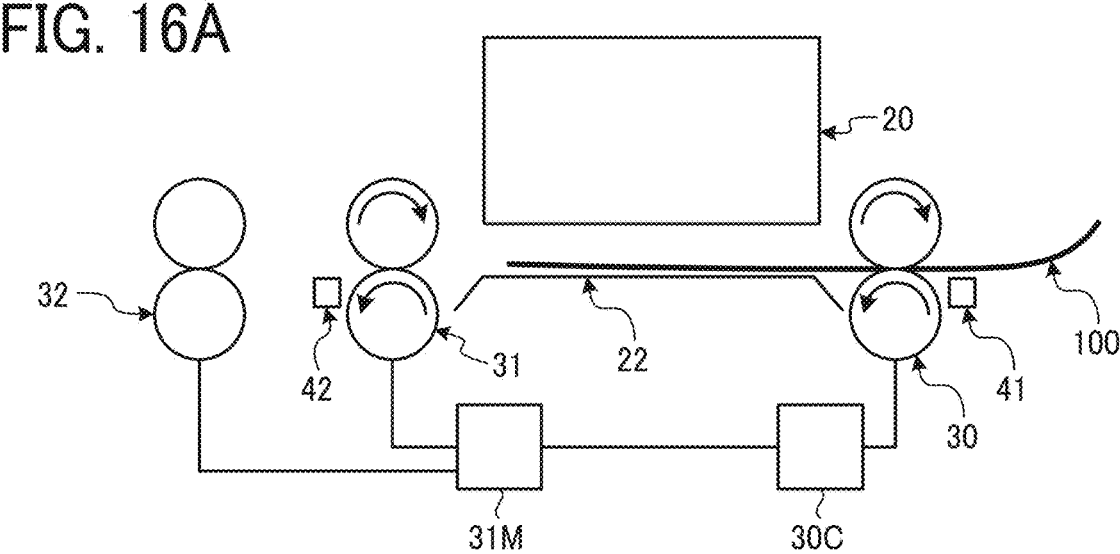
FIGS. 16A to 16C are diagrams illustrating an example of the procedure for conveying the sheet in the Y-axis direction according to the second embodiment.
Figure 16B:
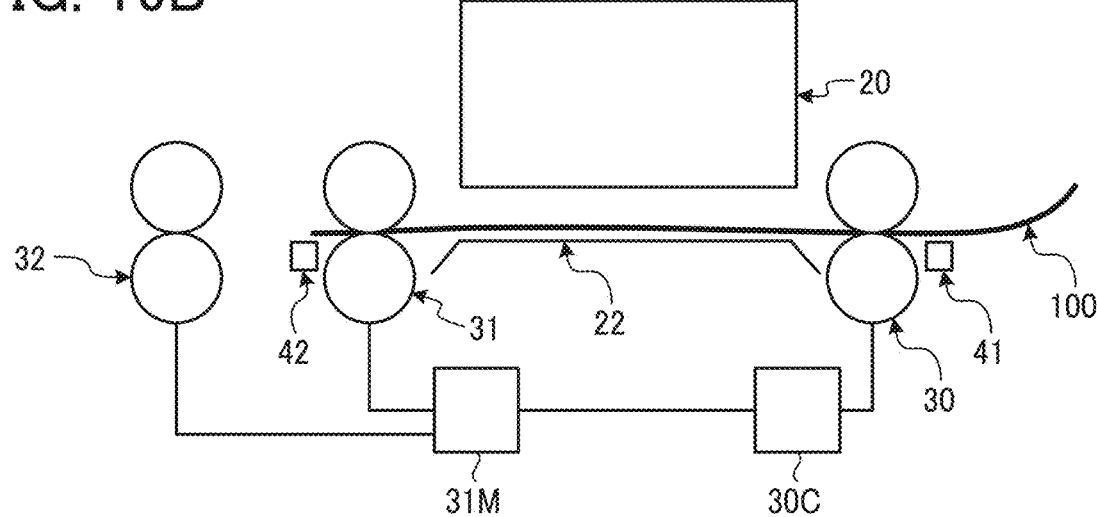
Figure 16C:
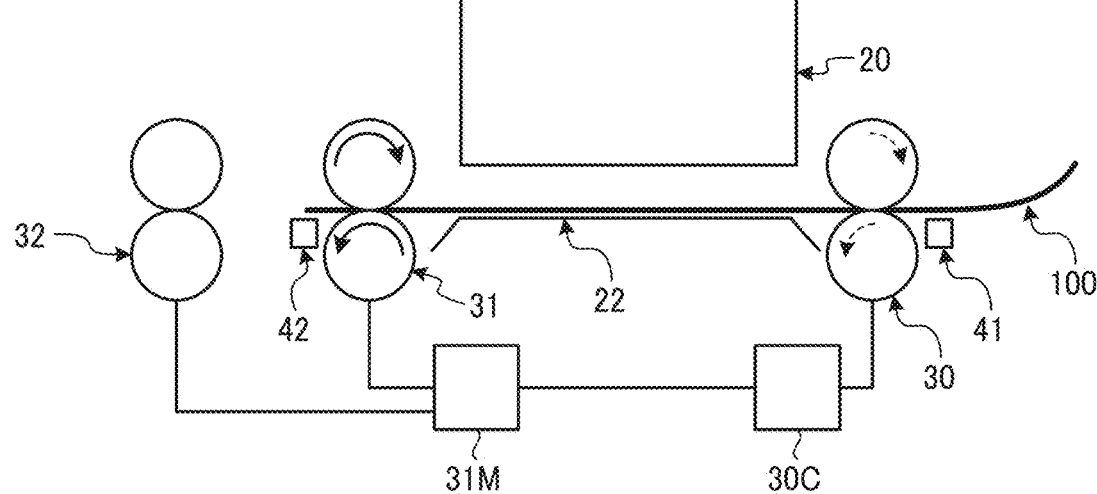

FIGS. 16A to 16C are diagrams illustrating an example of the procedure for conveying the sheet 100 in the Y-axis direction. As illustrated in FIG. 16A, the main controller 300A detects that the sheet 100 is positioned in front of the color data acquisition area 21 for the color data acquisition device 20 based on the output of the sheet detection sensor 41. After the detection, the main controller 300A controls the sheet conveying devices 30 and 31 by using the motor driver 308 so as to start to convey the sheet 100. Then, based on the output of the sheet detection sensor 42, the main controller 300A causes the sheet conveying devices 30 and 31 to be stopped.

As illustrated in FIG. 16B, at this point, the sheet 100 is not in close contact with the measurement reference surface 22 as there is no tension between the sheet conveying device 30 and the sheet conveying device 31.

Then, as illustrated in FIG. 16C, the main controller 300A uses the motor driver 308 to operate the driving motor 31M by a predetermined amount while the clutch 30C is on. This allows the sheet conveying device 31 to be driven while the sheet conveying device 30 is rotated together with a driving force of zero but with the load of the self-weight.

As illustrated in FIG. 16C, at this point, as there is tension between the sheet conveying device 30 and the sheet conveying device 31, the sheet 100 is secured without looseness or creases so that the sheet 100 is in close contact with the measurement reference surface 22. Thus, the main controller 300A applies predetermined tension to the sheet 100, which is the object, in the color data acquisition area 21 for acquiring the color data on the sheet 100.

The above-described driving amount of the driving motor 31M may be the same as that in the first embodiment as long as looseness or creases of the sheet 100 may be eliminated.

The securing force for the sheet 100 at the side of the sheet conveying device 30 is the frictional force due to the self-weight, the nip pressure, etc. In order not to apply excessive force that results in a damage to the sheet 100, the sheet conveying device 30 is rotated together so as to automatically prevent any trouble such as jam.

In addition to the self-weight, the nip pressure, etc., for the securing force for the sheet 100 at the side of the sheet conveying device 30, a torque limiter may be provided to obtain a certain tensile force.

As described above, according to the present embodiment, the spectral property acquisition apparatus including the spectroscopic sensors may be provided at low costs. Furthermore, the spectral property acquisition apparatus that executes two-dimensional scanning with the spectroscopic sensors without creases or looseness of a recording medium even in a large distance between the nip rollers may be provided at low costs.

Third Embodiment

Next, a third embodiment of the present invention is described.

The third embodiment is different from the first embodiment and the second embodiment in that the sheet conveying device 31 is disposed at a low position with respect to the sheet conveying device 30 and the measurement reference surface 22. In the following description of the third embodiment, the description of the same parts as those in the first embodiment and the second embodiment is omitted, and parts different from those in the first embodiment and the second embodiment are described.

Figure 17:
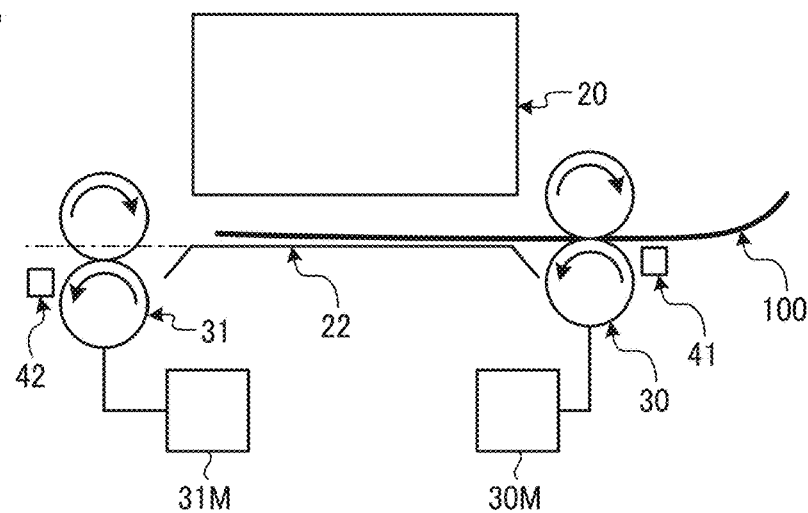
FIG. 17 is a diagram illustrating an example of the configuration in the periphery of the sheet conveying devices in the spectral property acquisition apparatus according to a third embodiment of the present invention.

FIG. 17 is a diagram illustrating an example of the configuration in the periphery of the sheet conveying devices 30 and 31 in the spectral property acquisition apparatus 10 according to the third embodiment. As illustrated in FIG. 17, the sheet conveying device 31 is disposed at a low position with respect to the sheet conveying device 30 and the measurement reference surface 22.

Here, the conveyance of the sheet 100 in the Y-axis direction is described.

Figure 18A:
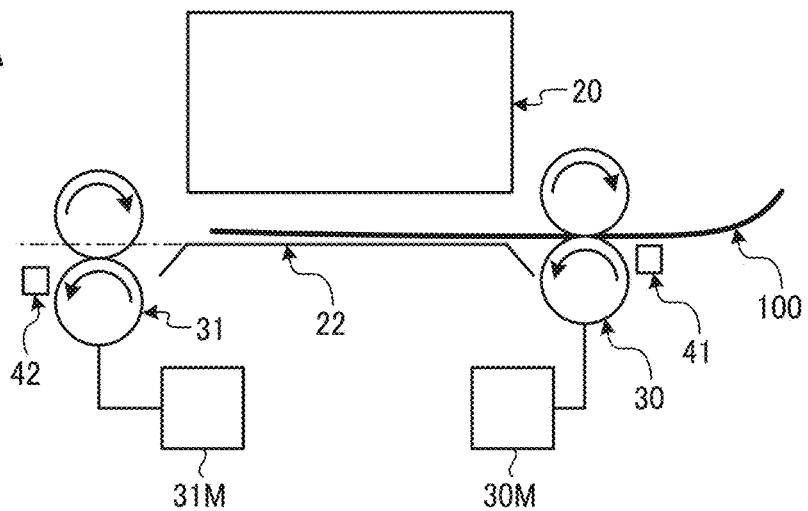
FIGS. 18A and 18B are diagrams illustrating an example of the procedure for conveying the sheet in the Y-axis direction according to the third embodiment.
Figure 18B:
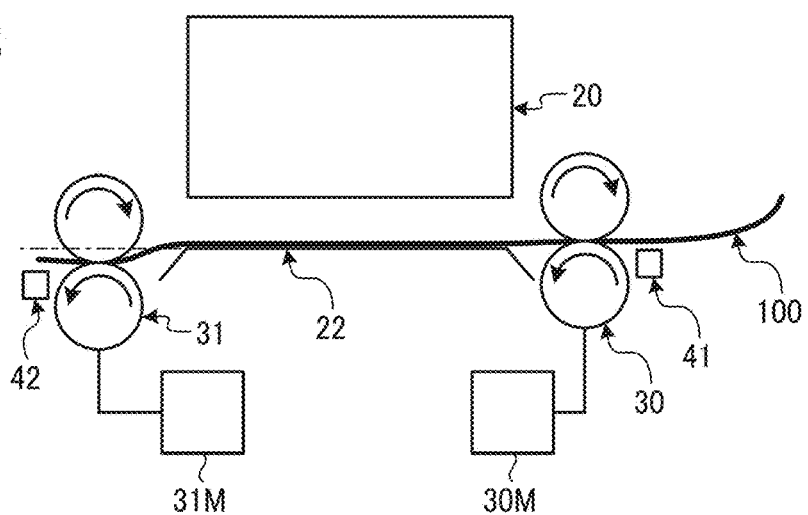

FIGS. 18A and 18B are diagrams illustrating an example of the procedure for conveying the sheet 100 in the Y-axis direction. As illustrated in FIG. 18A, the main controller 300A detects that the sheet 100 is positioned in front of the color data acquisition area 21 for the color data acquisition device 20 based on the output of the sheet detection sensor 41. After the detection, the main controller 300A controls the sheet conveying devices 30 and 31 by using the motor driver 308 so as to start to convey the sheet 100. Then, based on the output of the sheet detection sensor 42, the main controller 300A causes the sheet conveying devices 30 and 31 to be stopped.

As illustrated in FIG. 18B, when the sheet 100 is conveyed to the sheet conveying device 31, a downward pulling force is applied to the sheet 100 with respect to the measurement reference surface 22 so that the sheet 100 is in close contact with the measurement reference surface 22. The subsequent operation is the same as that in the first embodiment. Thus, the main controller 300A functions as part of a tension generating device that generates predetermined tension for the sheet 100, which is the object, in the color data acquisition area 21 in which the color data on the sheet 100 is acquired.

The low position with respect to the sheet conveying device 30 and the measurement reference surface 22 falls within such a small area that the sheet 100 is prevented from being folded.

As described above, according to the present embodiment, the spectral property acquisition apparatus including the spectroscopic sensors may be provided at low costs. Furthermore, the spectral property acquisition apparatus that executes two-dimensional scanning with the spectroscopic sensors without creases or looseness of a recording medium even in a large distance between the nip rollers may be provided at low costs.

Fourth Embodiment

Next, a fourth embodiment of the present invention is described.

The fourth embodiment is different from the first embodiment to the third embodiment in that the sheet conveying devices 30, 31, and 32 are coupled to the common driving motor 31M and a pressing device 90 that presses the sheet 100 is provided. In the following description of the fourth embodiment, the description of the same parts as those in the first embodiment to the third embodiment is omitted, and parts different from those in the first embodiment to the third embodiment are described.

Figure 19:
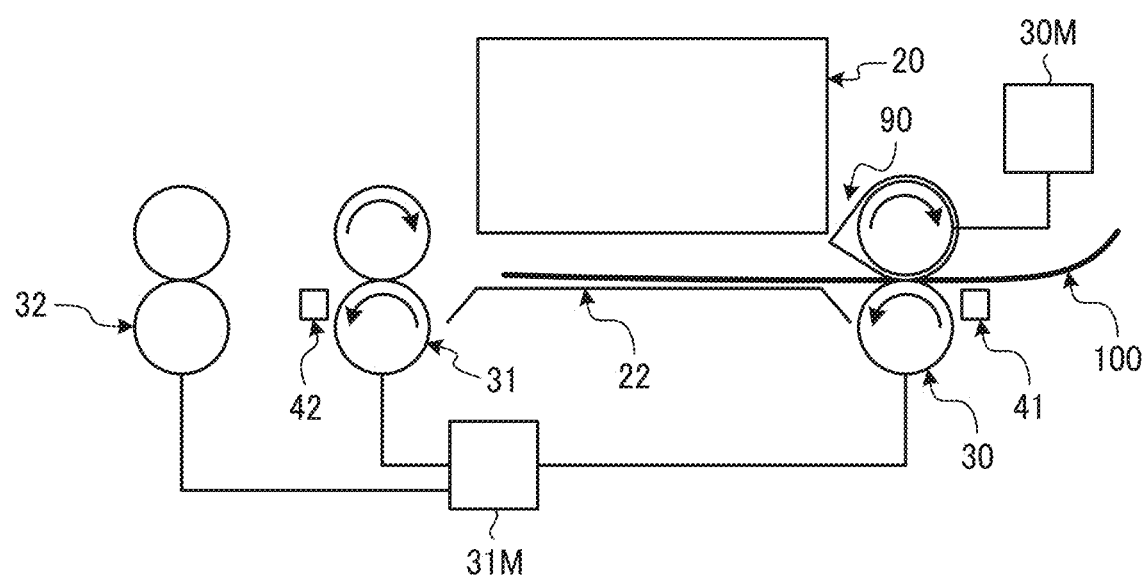
FIG. 19 is a diagram illustrating an example of the configuration in the periphery of the sheet conveying devices of the spectral property acquisition apparatus according to a fourth embodiment of the present invention.

FIG. 19 is a diagram illustrating an example of the configuration in the periphery of the sheet conveying devices 30, 31, and 32 of the spectral property acquisition apparatus 10 according to the fourth embodiment. As illustrated in FIG. 19, the sheet conveying devices 30, 31, and 32 are coupled to the common driving motor 31M. The pressing device 90 that presses the sheet 100 is disposed on the side of the sheet conveying device 30. The pressing device 90 may be driven independently by the driving motor 30M.

The pressing device 90 includes, for example, a resin that is not sharp so as not to damage the sheet 100. The pressing device 90 includes one or more pressing portions to press the sheet 100 evenly. The driving motor 30M causes the pressing device 90 to rotate so that the pressing portion presses or releases the sheet 100.

Here, the conveyance of the sheet 100 in the Y-axis direction is described.

Figure 20A:
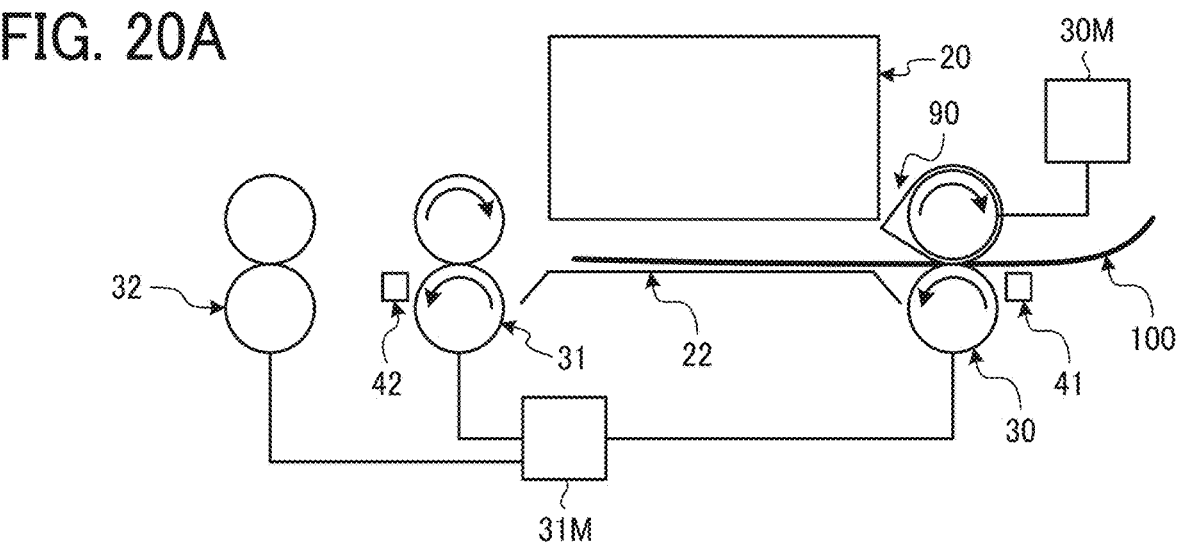
FIGS. 20A to 20C are diagrams illustrating an example of the procedure for conveying the sheet in the Y-axis direction according to the fourth embodiment.
Figure 20B:
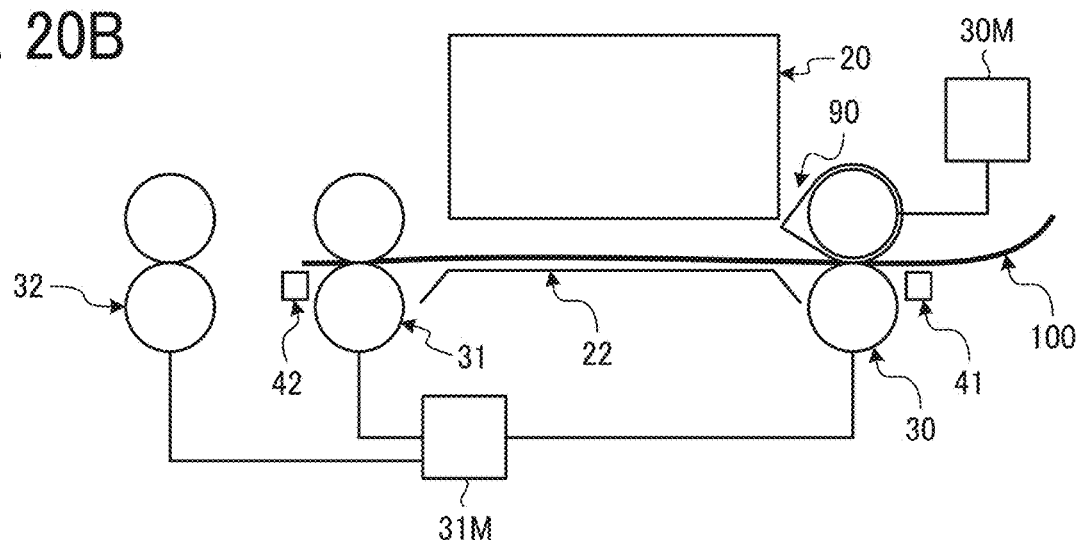
Figure 20C:
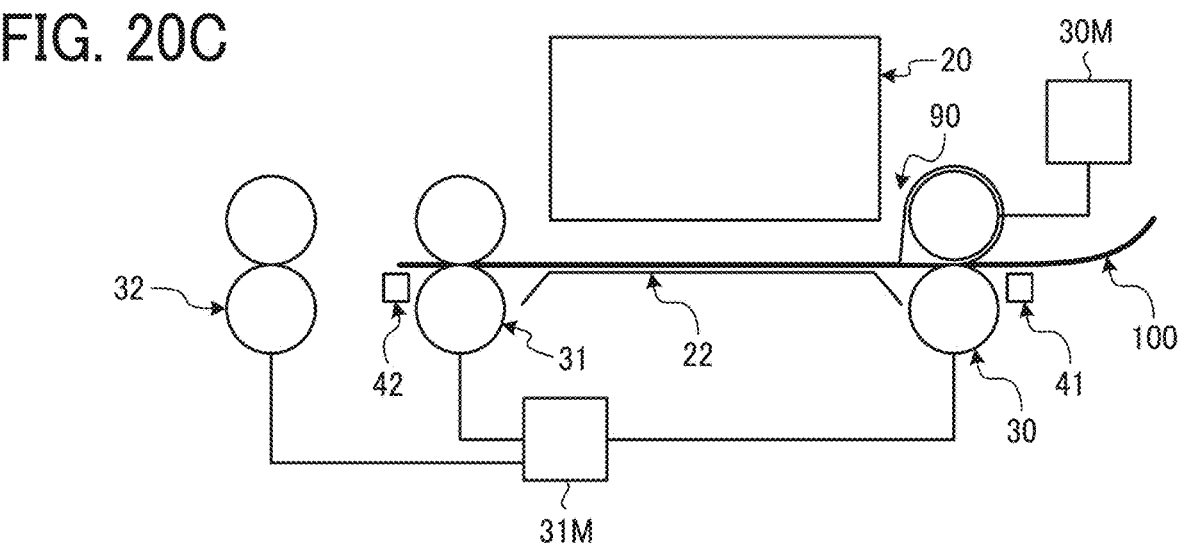

FIGS. 20A to 20C are diagrams illustrating an example of the procedure for conveying the sheet 100 in the Y-axis direction. As illustrated in FIG. 20A, the main controller 300A detects that the sheet 100 is positioned in front of the color data acquisition area 21 for the color data acquisition device 20 based on the output of the sheet detection sensor 41. After the detection, the main controller 300A controls the sheet conveying devices 30 and 31 by using the motor driver 308 so as to start to convey the sheet 100. Then, based on the output of the sheet detection sensor 42, the main controller 300A causes the sheet conveying devices 30 and 31 to be stopped.

As illustrated in FIG. 20B, at this point, the sheet 100 is not in close contact with the measurement reference surface 22 as there is no tension between the sheet conveying device 30 and the sheet conveying device 31.

Then, as illustrated in FIG. 20C, the main controller 300A uses the motor driver 308 to drive the driving motor 30M so as to rotate the pressing device 90 while the sheet conveying device 31 is stopped.

Thus, the pressing device 90 presses the sheet 100 so as to eliminate the looseness or creases of the sheet 100 so that the sheet 100 is in close contact with the measurement reference surface 22. The subsequent operation is the same as that in the first embodiment. Thus, the main controller 300A generates predetermined tension for the sheet 100 in the color data acquisition area 21 in which the color data on the sheet 100, which is the object, is acquired.

As described above, according to the present embodiment, the spectral property acquisition apparatus including the spectroscopic sensors may be provided at low costs. Furthermore, the spectral property acquisition apparatus that executes two-dimensional scanning with the spectroscopic sensors without creases or looseness of a recording medium even in a large distance between the nip rollers may be provided at low costs.

The pressing device 90 may be provided on the side of the sheet conveying device 31 located downstream of the color data acquisition area 21 in the conveying direction; however, as there is a possibility that the detection position of the sheet detection sensor 42 is changed, the pressing device 90 may be provided on the side of the sheet conveying device 30 located upstream of the conveying direction in the color data acquisition area 21.

Fifth Embodiment

Next, a fifth embodiment of the present invention is described.

The fifth embodiment is different from the first embodiment to the fourth embodiment in that, with regard to the sheet conveying devices 30 and 31, there is a difference in the driving force between a center side roller and both side rollers in the direction crossing the conveying direction. In the following description of the fifth embodiment, the description of the same parts as those in the first embodiment to the fourth embodiment is omitted, and parts different from the first embodiment to the fourth embodiment are described.

Figure 21:
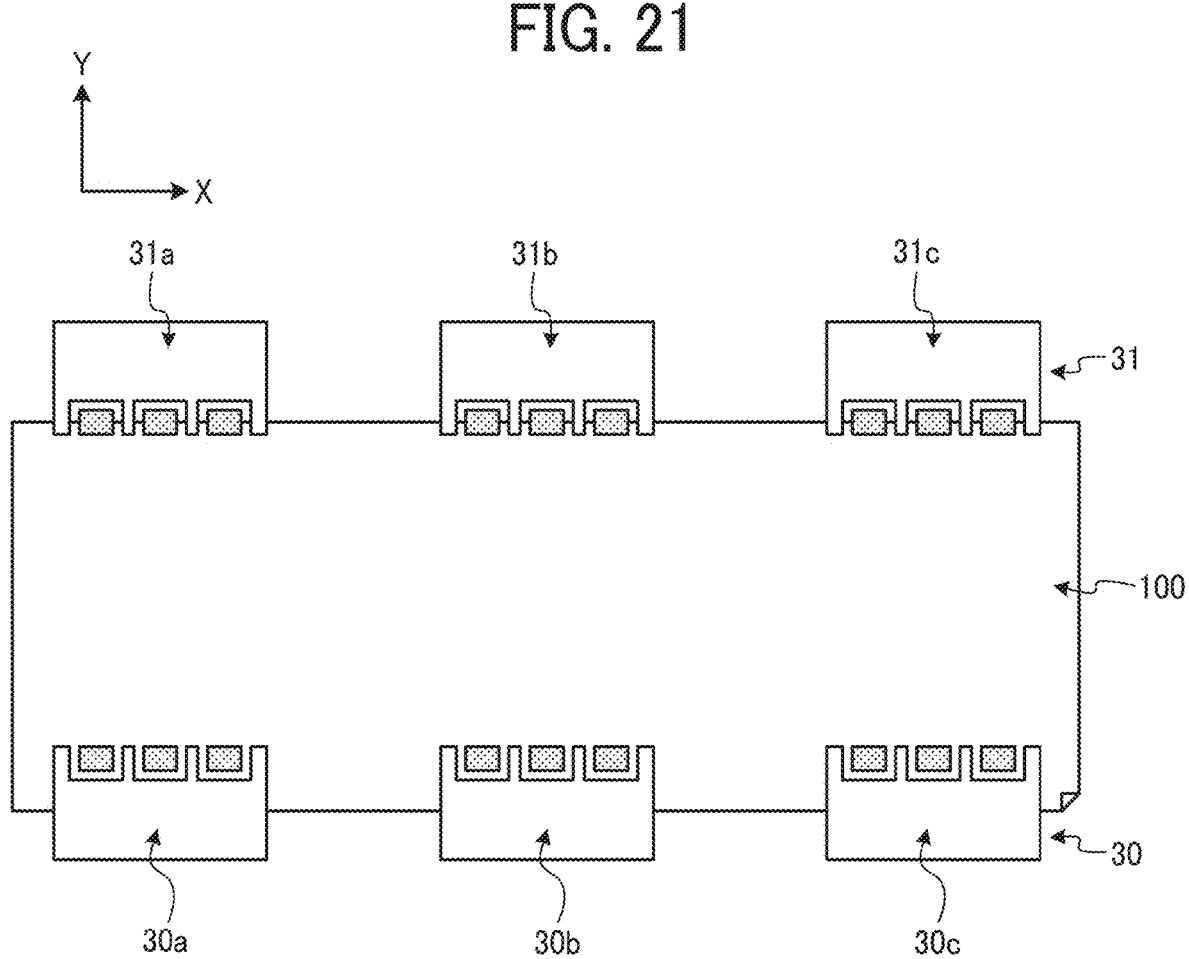
FIG. 21 is a top view of the sheet conveying devices of the spectral property acquisition apparatus according to a fifth embodiment of the present invention.

FIG. 21 is a top view of the sheet conveying devices 30 and 31 of the spectral property acquisition apparatus 10 according to the fifth embodiment. As illustrated in FIG. 21, the sheet conveying device 30 includes two end portions 30a and 30c and a central portion 30b. The end portions 30a and 30b and the central portion 30b include different pressing members. The sheet conveying device 31 also includes two end portions 31a and 31c and a central portion 31b. The end portions 31a and 31c and the central portion 31b include different pressing members.

The end portions 30a and 30c of the sheet conveying device 30 are formed to have a slightly large diameter as compared with the central portion 30b. Therefore, in the sheet conveying device 30, the speed of the end portions 30a and 30c is slightly faster than that of the central portion 30b.

Similarly, the end portions 31a and 31 c of the sheet conveying device 31 are formed to have a slightly large diameter as compared with the central portion 31b. Therefore, in the sheet conveying device 31, the speed of the end portions 31a and 31c is slightly faster than that of the central portion 31b.

That is, with regard to the sheet conveying devices 30 and 31, there is a difference in the driving force between the center side roller and the both side rollers in the direction crossing the conveying direction.

Thus, when the sheet 100 is conveyed by the sheet conveying devices 30 and 31, the sheet 100 is pulled in a direction from the center of the sheet 100 to two ends thereof so that the looseness or creases of the sheet 100 may be eliminated.

As described above, according to the present embodiment, the spectral property acquisition apparatus including the spectroscopic sensors may be provided at low costs. Furthermore, the spectral property acquisition apparatus that executes two-dimensional scanning with the spectroscopic sensors without creases or looseness of a recording medium even in a large distance between the nip rollers may be provided at low costs.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A spectral property acquisition apparatus comprising:
at least two first conveying devices, each including at least a pair of rollers, configured to convey an object in a conveying direction to a color data acquisition area;
a guide plate located in the color data acquisition area;
a color data acquisition device, including a light source and a plurality of spectroscopic sensors arranged in the conveying direction, the plurality of spectroscopic sensors being configured to receive light emitted by the light source and reflected by the object to acquire color data on the object located in the color data acquisition area;
a second conveying device, including a conveying stage with a guide, configured to convey the color data acquisition device in a direction orthogonal to the conveying direction; and circuitry configured to estimate a spectral property of the object based on the color data acquired,
control at least one of the at least two first conveying devices to generate a tension on the object to place a surface of the object in close contact with a measurement reference surface of the guide plate prior to conveyance of the color data acquisition device via the second conveying device in the direction orthogonal to the conveying direction, in the color data acquisition area in which the color data on the object is to be acquired, and
control the at least two first conveying devices, such that the sheet is stopped in the color data acquisition area and tension is applied to the sheet to stretch the sheet, after the sheet conveying device is stopped,
wherein the circuitry controls the at least two first conveying devices to rotate backward, so as to apply the tension, wherein the at least a pair of rollers includes a first nip roller and a second nip roller, the first nip roller and the second nip roller each respectively having a different driving force, the first nip roller is located upstream of the conveying direction in the color data acquisition area, and the second nip roller is located downstream of the color data acquisition area in the conveying direction.

2. The spectral property acquisition apparatus of claim 1, wherein the circuitry is configured to set a driving force of the first nip roller to be relatively higher than a driving force of the second nip roller.

3. The spectral property acquisition apparatus of claim 1, wherein the circuitry is configured to apply a driving force to the second nip roller for forward and backward rotation of the second nip roller.

4. The spectral property acquisition apparatus of claim 1, wherein the second nip roller includes a torque limiter.

5. The spectral property acquisition apparatus of claim 1, wherein the first nip roller is located at a position relatively lower than a level of the color data acquisition area.

6. The spectral property acquisition apparatus of claim 1, further comprising a presser, provided between the first nip roller and the second nip roller, to press the object.

7. The spectral property acquisition apparatus of claim 1, wherein the circuitry is configured to cause the driving force to differ with respect to a center side nip roller and two respective side nip rollers, respectively of one of the first nip roller and the second nip roller, in a direction orthogonal to the conveying direction.

8. The spectral property acquisition apparatus of claim 1, wherein the circuitry is configured to apply a conversion matrix to estimate a spectral property of the object based on the color data.

9. An image forming apparatus comprising: the spectral property acquisition apparatus of claim 1.

10. The spectral property acquisition apparatus of claim 1, wherein the circuitry is further configured to control the second conveying device to convey the color data acquisition device, in the direction orthogonal to the conveying direction, a plurality of times to acquire the color data of the entire color data acquisition area in which the color data on the object is to be acquired.

11. The spectral property acquisition apparatus of claim 10, wherein the circuitry is configured to apply a conversion matrix, to estimate a spectral property of the object based on the color data, after each respective conveyance of the color data acquisition device, for each of the plurality of times.

12. An image forming apparatus comprising:
the spectral property acquisition apparatus of claim 10.

13. An image forming apparatus comprising:
the spectral property acquisition apparatus of claim 11.

14. The spectral property acquisition apparatus of claim 1, wherein the circuitry is further configured to control the second conveying device to respectively convey the color data acquisition device, to acquire the color data, over an entire color data acquisition area in which the color data on the object is to be acquired.

15. The spectral property acquisition apparatus of claim 14, wherein the circuitry is configured to apply a conversion matrix, to estimate a spectral property of the object based on the color data, after each respective conveyance of the color data acquisition device.

16. An image forming apparatus comprising:
the spectral property acquisition apparatus of claim 14.

17. An image forming apparatus comprising:
the spectral property acquisition apparatus of claim 15.

18. The spectral property acquisition apparatus of claim 1, further comprising a calibration color chart located adjacent to the color data acquisition device in the direction orthogonal to the conveying direction and within a range in which the color data acquisition device conveying device conveys the color data acquisition device, wherein the circuitry is further configured to convey the color data acquisition device to a position of the calibration color chart so that calibration using the calibration color chart may be performed.

* * * * *